Jan. 9, 1968  N. W. DENSMORE  3,362,752

MINING APPARATUS AND METHOD

Filed Aug. 17, 1965  13 Sheets-Sheet 1

INVENTOR.
NEAL W. DENSMORE

BY Edward W. Nypaver

ATTORNEY

Jan. 9, 1968  N. W. DENSMORE  3,362,752
MINING APPARATUS AND METHOD
Filed Aug. 17, 1965  13 Sheets-Sheet 3

INVENTOR.
NEAL W. DENSMORE
BY
Edward W. Nypaver
ATTORNEY

Jan. 9, 1968 N. W. DENSMORE 3,362,752
MINING APPARATUS AND METHOD
Filed Aug. 17, 1965 13 Sheets-Sheet 4
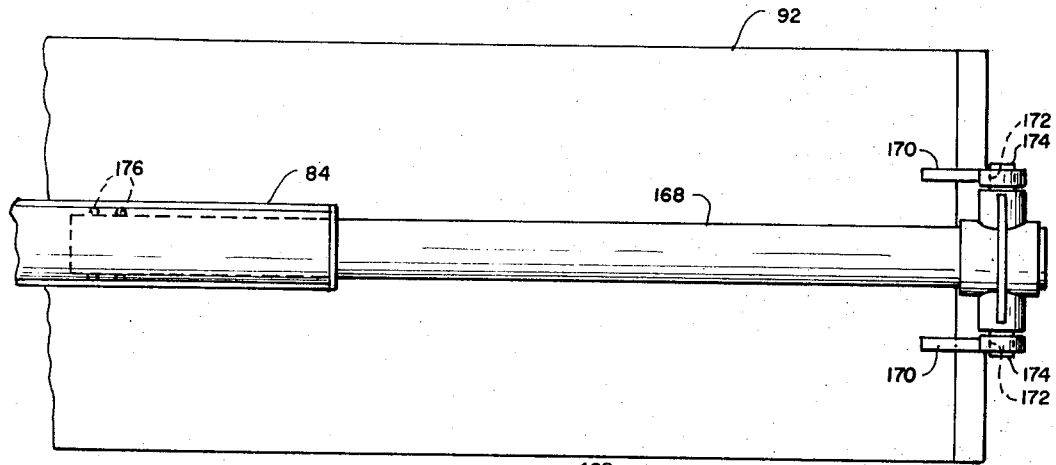
Fig. 11
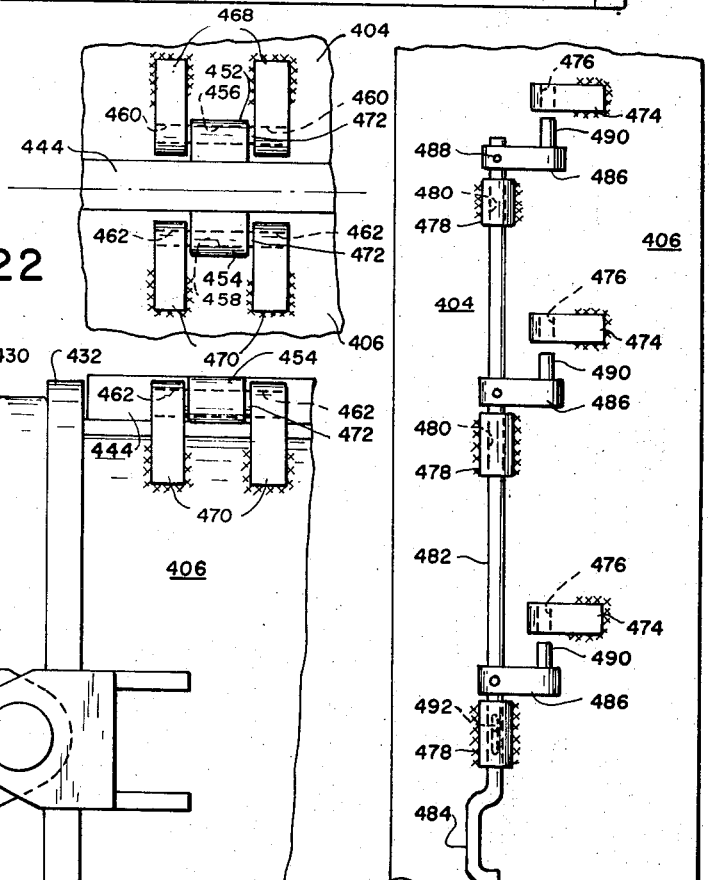
Fig. 22
Fig. 21
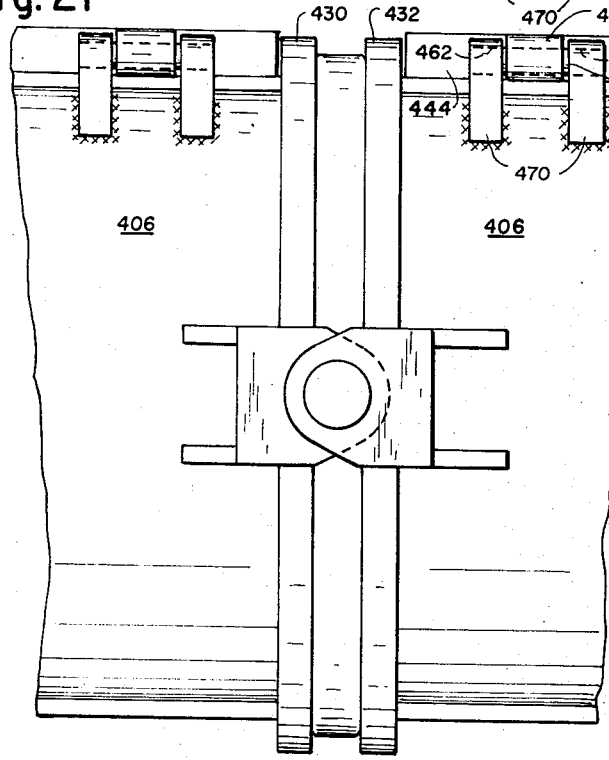
Fig. 23
INVENTOR.
NEAL W. DENSMORE
BY
Edward W. Nypaver
ATTORNEY Jan. 9, 1968     N. W. DENSMORE     3,362,752
MINING APPARATUS AND METHOD
Filed Aug. 17, 1965     13 Sheets-Sheet 5

INVENTOR.
NEAL W. DENSMORE
BY
Edward W. Nypaver
ATTORNEY

Jan. 9, 1968  N. W. DENSMORE  3,362,752
MINING APPARATUS AND METHOD
Filed Aug. 17, 1965  13 Sheets-Sheet 6

INVENTOR.
NEAL W. DENSMORE
BY
Edward W. Nypaver
ATTORNEY

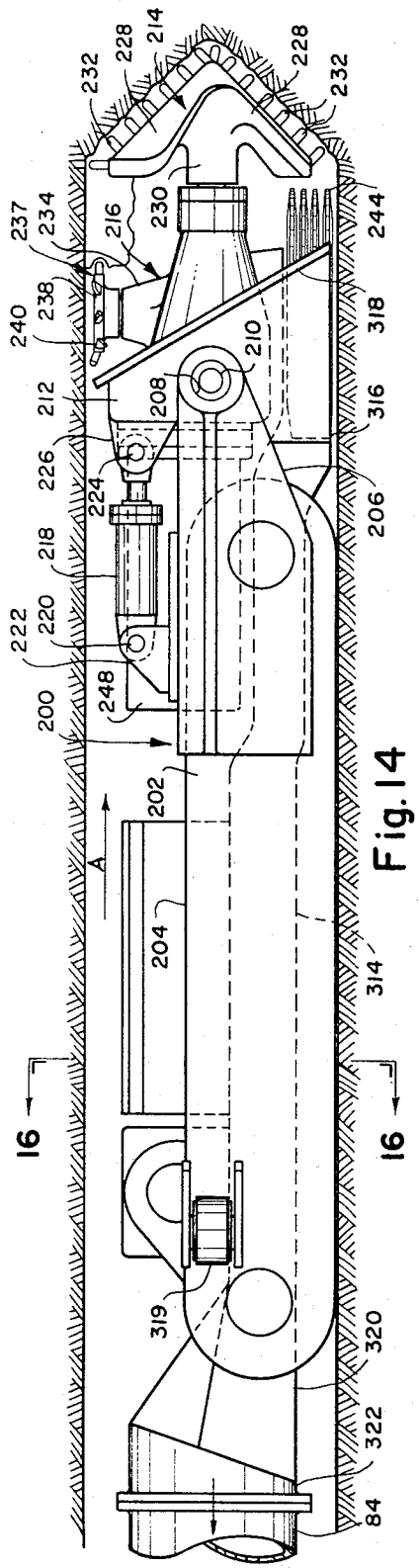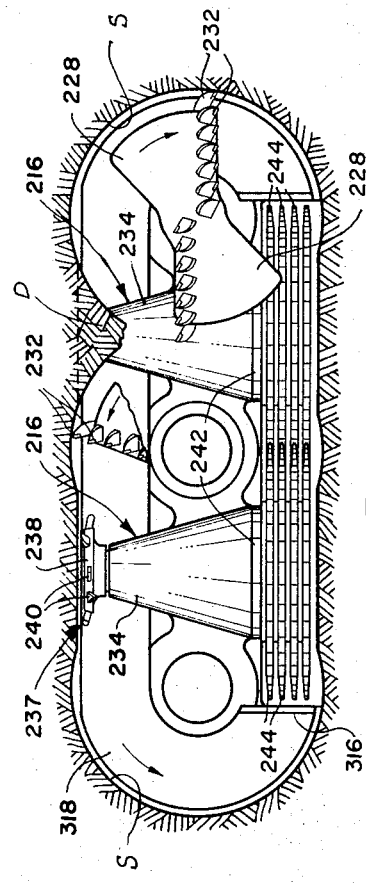

Jan. 9, 1968   N. W. DENSMORE   3,362,752
MINING APPARATUS AND METHOD
Filed Aug. 17, 1965   13 Sheets-Sheet 8
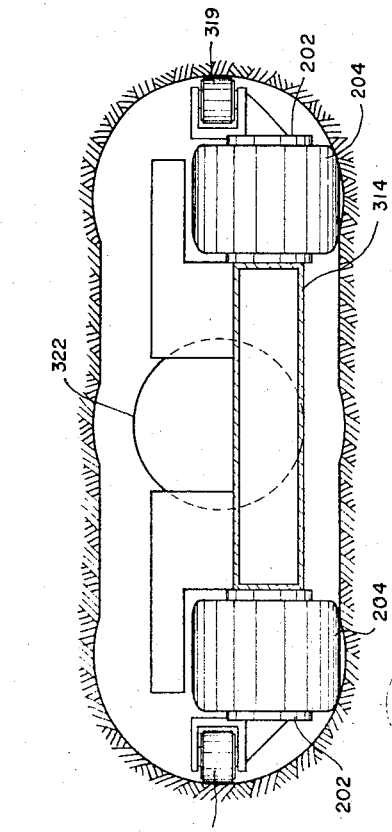
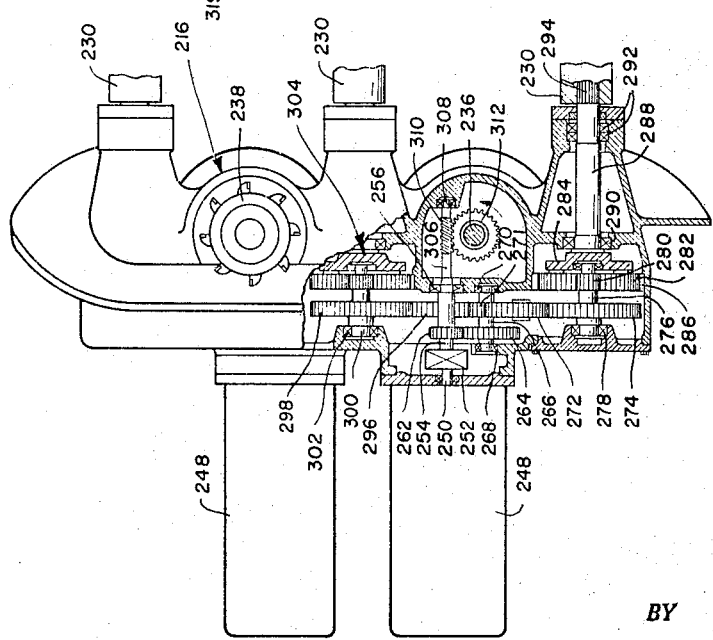
INVENTOR.
NEAL W. DENSMORE
BY
Edward W. Nypaver
ATTORNEY Jan. 9, 1968 N. W. DENSMORE 3,362,752
MINING APPARATUS AND METHOD
Filed Aug. 17, 1965 13 Sheets-Sheet 9

INVENTOR.
NEAL W. DENSMORE
BY
Edward W. Nypaver
ATTORNEY

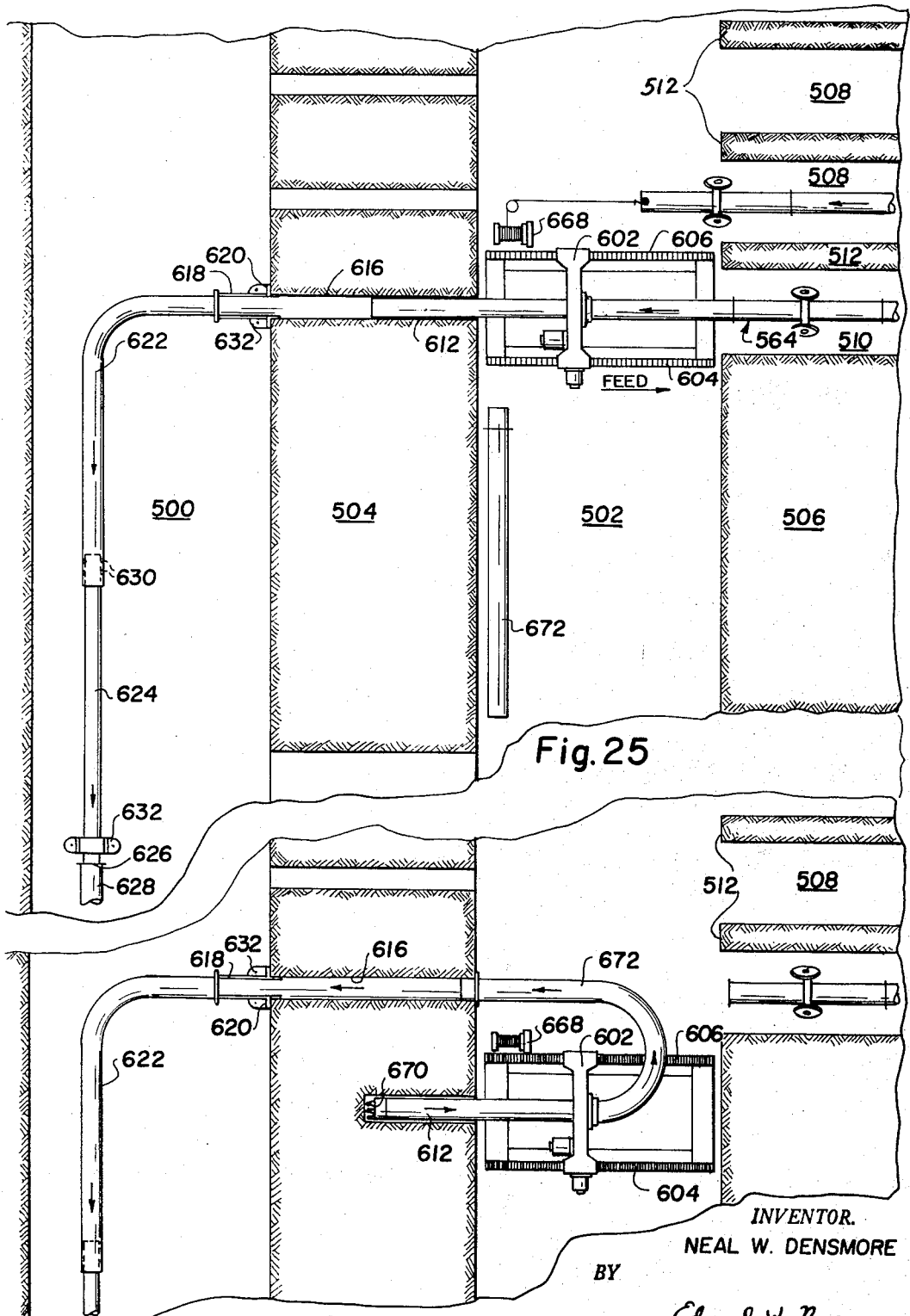

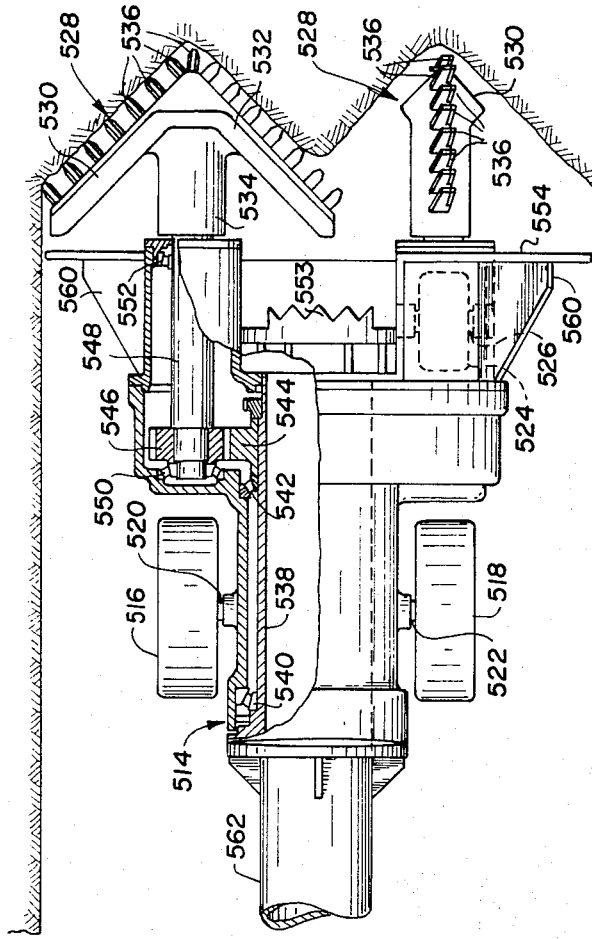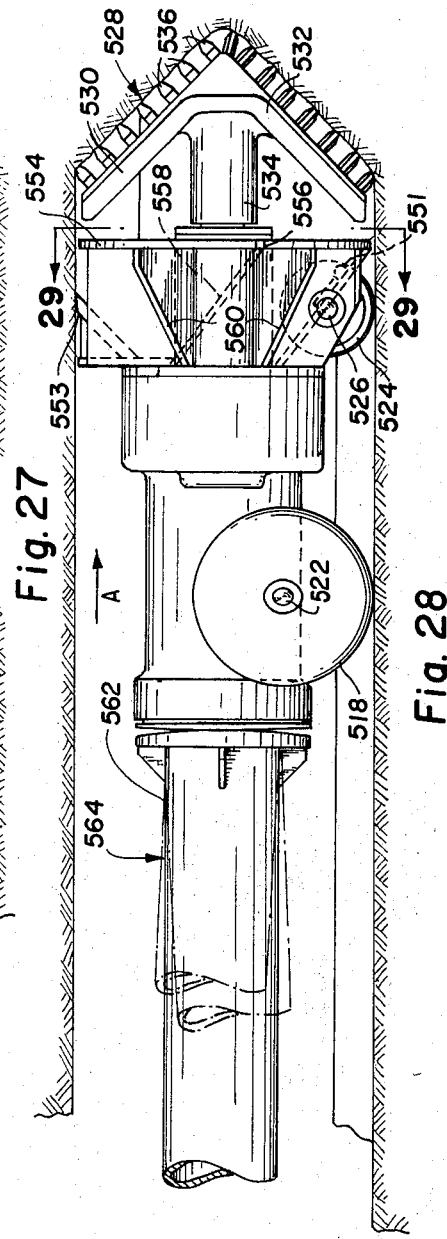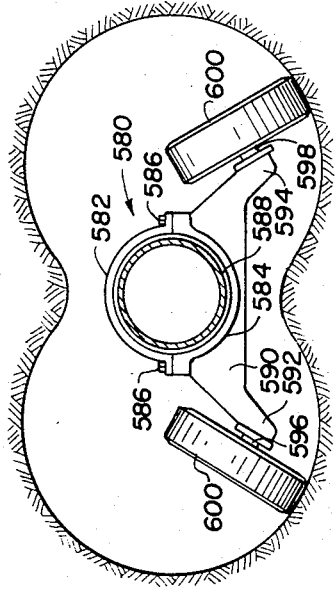

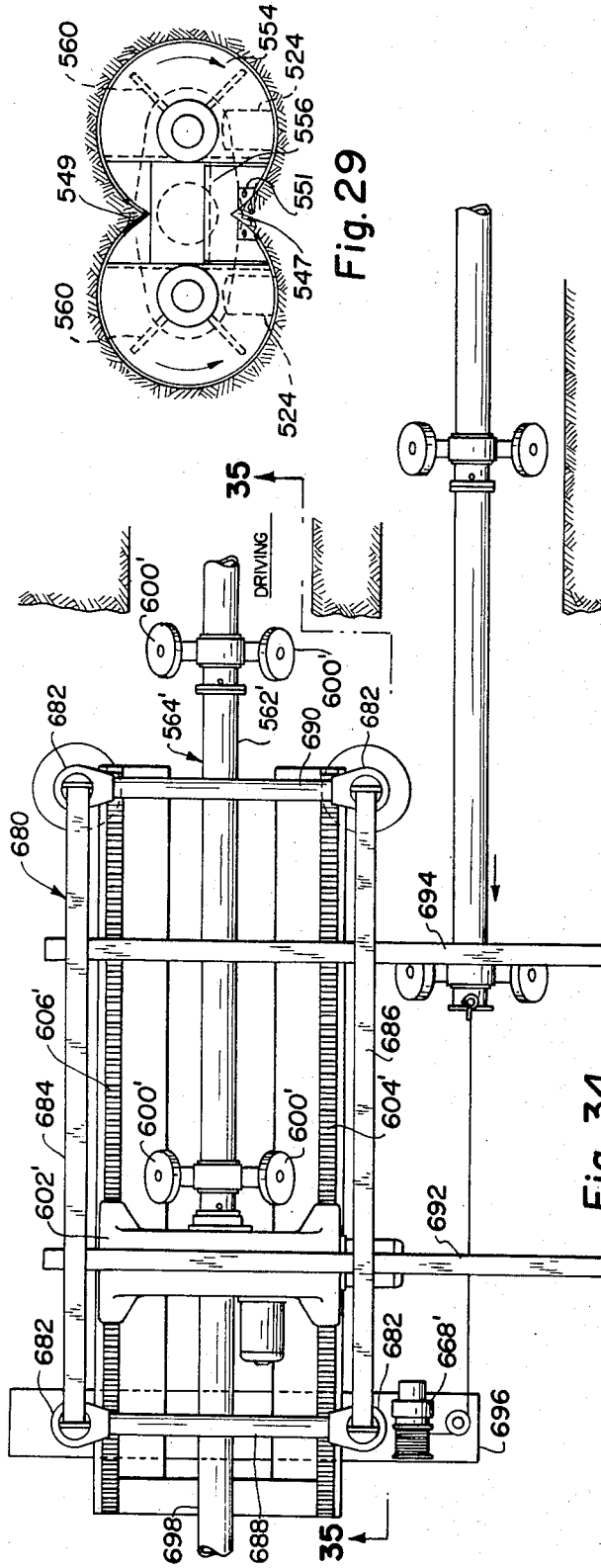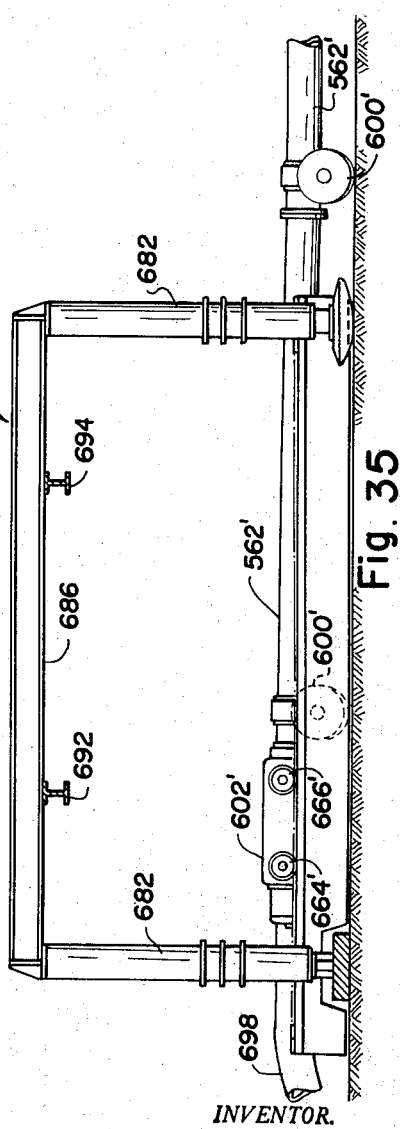

INVENTOR.
NEAL W. DENSMORE
BY
Edward W. Nypaver
ATTORNEY

United States Patent Office 3,362,752
Patented Jan. 9, 1968

3,362,752
MINING APPARATUS AND METHOD
Neal W. Densmore, Franklin, Pa., assignor to Joy Manufacturing Company, Pittsburgh, Pa., a corporation of Pennsylvania
Filed Aug. 17, 1965, Ser. No. 480,429
18 Claims. (Cl. 299—18)

ABSTRACT OF THE DISCLOSURE

A continuous mining apparatus and method comprising delivering mined mineral from a mining head to a mechanism wherein the mineral is selectively sized to air entrainable particles which are subsequently transported through a pneumatic haulage structure and thereafter separated from the air stream in which it is entrained.

---

In a continuous mining apparatus of a known type employed in highwall mining, a self-propelled mining apparatus is controlled from a station that is remotely located with respect to the mining machine. By various signaling and detecting devices in the control station, the operator is always aware of the location of the machine with respect to a boundary of the seam, the rate of travel of such machine, and its inclination in a longitudinal and transverse plane without having to enter the area or passageway being mined. As a result of these signals, the operator controls the operation, advance, retreat and guidance of the mining machine.

In order to convey the disintegrated material outside of the bore hole being formed, an elongated, flexible string of self-propelled conveyor cars is arranged to follow the mining machine and to transport, in cascade manner, a mineral product of the acting of such mining machine to a remote storage or haulage area.

Although such prior-known machines have served the purpose for which they were designed, their applications in modern day operations are extremely limited and their cost is almost prohibitive. Furthermore, each of the self-propelled conveyor cars has numerous parts and movable components subject to failure, any one of which results in system failure.

The general purpose of this invention is to overcome the above disadvantages by providing a continuous mining apparatus for disintegrating and crushing mined mineral into particles no larger than a given size and providing an extensible, pneumatic conveying means which is reliable in operation, compact and simple in construction, and requiring only a minimum amount of working parts thereby realizing an appreciable reduction in manufacturing and operating costs.

It is therefore an object of the present invention to provide a new and improved haulage or conveyor system.

It is a further object of this invention to provide a method and apparatus of conveying material pneumatically through an extensible conveyor means.

It is another object of the present invention to provide a method and apparatus of conveying material pneumatically through an extensible conveyor means which is formed of a series of mobile conveyor units.

It is a specific object of this invention to provide a new and improved mobile conveyor pipe means.

It is another specific object of this invention to provide a new and improved mining apparatus having novel disintegrating and crushing means.

It is still another specific object of this invention to provide a new and improved mining apparatus having novel means for disintegrating mineral into particles no larger than a given size and a novel pneumatic conveyor means for delivering such mineral product to a remote location.

It is a further specific object of this invention to provide a new and improved continuous mining apparatus having novel means for disintegrating mineral into particles no larger than a given size and a novel extensible conveyor means for transporting such mineral, said conveyor means having a train of conveyor units which can be readily assembled and attached in series without interfering with the continuous mining operation desirably taking place.

It is still a further specific object of this invention to provide a new and improved continuous mining system employing novel pneumatic conveyor means and means for facilitating the assembly and attachment of individual conveyor units onto said conveyor means for extending the same while precluding leakage of pressure therein.

It is another specific object of this invention to provide a new and improved mining apparatus with a novel carriage means for effecting thrust and rotation of the mining apparatus.

It is a further specific object of this invention to provide a new and improved mining apparatus, a novel carriage means for effecting thrust and rotation for said mining apparatus and novel pneumatic extensible conveyor means for transporting material therethrough while transmitting such thrust and rotation to said mining apparatus.

These and other objects of the present invention will become more apparent upon consideration of the following detailed description thereof when taken in conjunction with the following drawings, in which:

FIG. 11 is an enlarged, top plan view of the ramp, showing the "quill" with a conveyor pipe unit assembled thereabout;

FIG. 14 is a side elevational view of the mining apparatus of FIG. 13;

FIG. 15 is a front elevational view of the mining apparatus of FIG. 13 with parts broken away to more clearly show the structure thereof;

FIG. 16 is a vertical section, taken on the plane of line 16—16 of FIG. 14;

FIG. 17 is a fragmentary, top plan view of the mining apparatus with parts broken away to more clearly show the driving arrangement thereof;

FIG. 18 is a diagrammatic view of the gear drive train for the boring heads and crushing means;

FIG. 21 is an enlarged, fragmentary, side elevational view of the conveyor unit of FIG. 19, showing the connection means for adjacent conveyor units;

FIG. 22 is a fragmentary, top plan view of the hinge means for the conveyor unit shown in FIG. 19; and FIG. 23 is a fragmentary, bottom view of the clamping means for the conveyor unit shown in FIG. 19;

FIG. 25 is a diagrammatic sectional plan view of a mining area being actively mined showing the carriage of the embodiment employed in the mining plan of FIG. 24 in a boring operation;

FIG. 26 is a diagrammatic sectional plan view of a mining area being actively mined showing the carriage of the embodiment of FIG. 25 in a pillar drilling operation;

FIG. 27 is a top plan view, partially in section, of the mining apparatus of the embodiment employed in the mining plan of FIG. 24 constructed in accordance with the principles of this invention;

FIG. 28 is a side elevational view of the mining apparatus of FIG. 27;

FIG. 29 is a vertical section taken on the plane of line 29—29 of FIG. 28;

FIG. 31 is a cross-section of a tubular conveyor pipe unit of the embodiment employed in the mining plan of FIG. 24 showing a mobile saddle disposed thereabout;

FIG. 34 is a top plan view of still another embodiment of the present invention; and FIG. 35 is a side elevational view taken on line 35—35 of FIG. 34.

Figure 1:
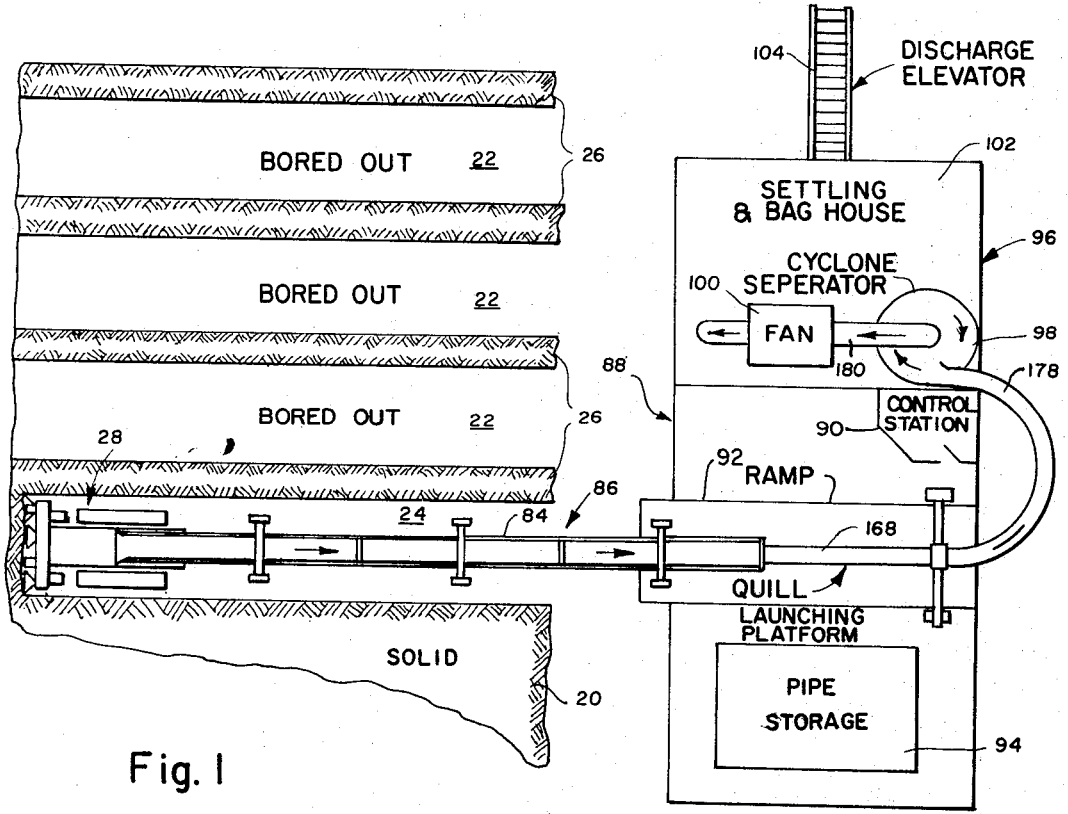
FIG. 1 is a diagrammatic top plan view of a remotely-controlled, continuous mining machine, together with a sectional plan view of a mining area being actively mined by such mining machine and provided with an extensible continuous conveying system operating in accordance with the principles of this invention.

In FIG. 1 there is shown a typical surface entry or highwall mining plan, illustrating a portion of the mineral vein in horizontal section, which comprises a large, unmined portion 20, a plurality of elongated, parallel, completed bore holes 22 (shown extending to the left as viewed in FIG. 1) and one incomplete bore hole 24, separated by elongated, narrow, unmined rib portions 26. It should be realized that the apparatus and method of this invention is in no manner restricted to the particular field of application, i.e., highwall mining, but has utility in other mining systems and plans.

Figure 2:
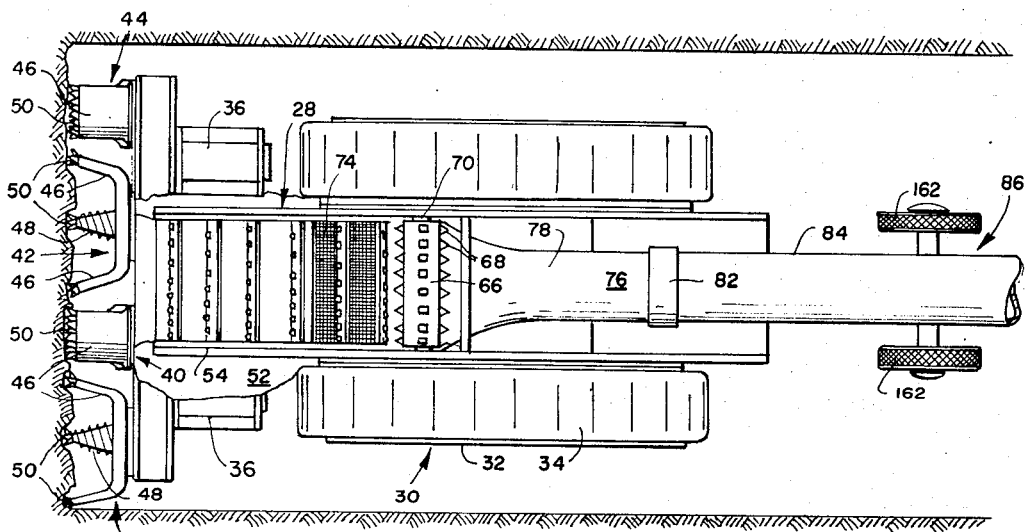
FIG. 2 is a top plan view of the mining apparatus constructed in accordance with the principles of this invention with parts broken away to more clearly show the structure thereof.
Figure 3:
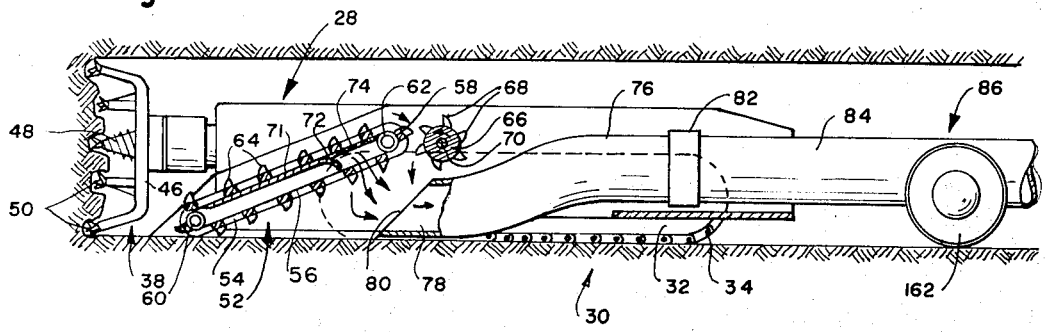
FIG. 3 is a side elevational view of the mining apparatus of FIG. 2, partially in section.
Figure 6:
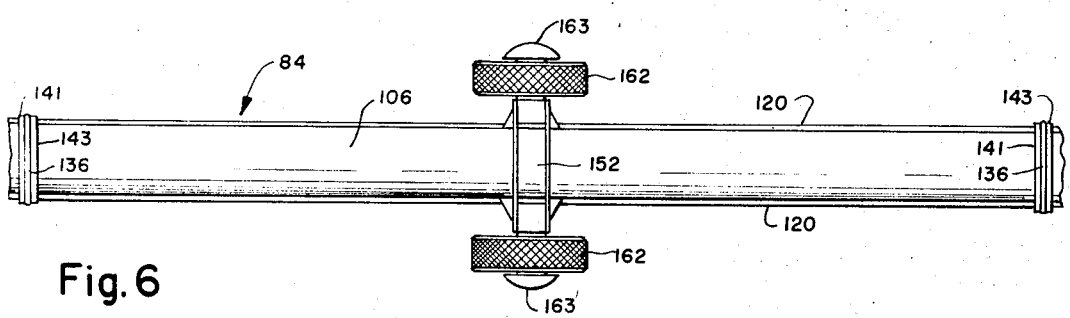
FIG. 6 is a top plan view of one embodiment of the mobile conveyor pipe unit of the present invention.

Referring to FIGS. 2 and 3 of the drawings, it will be noted that a mining apparatus constructed in accordance with the principles of this invention comprises an enlongated main frame, generally designated 28, supported by a pair of suitable crawler tread means 30 having conventional tread frames 32 suitably rigidly secured to laterally opposed sides of the main frame, respectively. Endless tread means 34, well known in the art, are trained about tread frames 32, respectively, and power means (not shown) are provided for circulating the endless tread means 34 about the tread frames for propelling the apparatus along the ground.

Suitable drive means such as a pair of electrical motors 36, suitably electrically connected to a remote source of power (not shown) are suitably rigidly secured adjacent the forward end of frame 28 and are operatively connected to boring heads 38, 40, 42, and 44 for rotating the same through suitable reduction gearing means, not shown but well known in the art. Each of the boring heads has a pair of boring arms 46 and a forwardly projecting pilot cutter 48 for supporting a plurality of suitable cutter bits 50 for removing mineral from a vein in a manner well known in the art.

For purposes of this description, the forward end of the apparatus will be the left-hand side of the apparatus as viewed in FIGS. 2 and 3. The terms forwardly, rearwardly, upwardly, downwardly and the like, as used herein, are applied only for convenience of description and should not be taken as limiting the scope of this invention.

Conveying means generally designated 52, extending longitudinally centrally of the forward portion of main frame 28, extends rearwardly and upwardly from adjacent the rear of the lower portion of the boring heads and terminates substantially centrally of main frame 28.

This conveying means comprises an endless conveyor chain 54 carrying spaced cross-flights 56, said chain being trained about a pair of laterally spaced drive sprockets 58 and a pair of laterally spaced idler sprockets 60 for movement in an endless orbital path. Drive sprockets 58 are mounted adjacent the opposite ends of an elongated transversely extending shaft 62 which is driven by a pair of suitable electric motors (not shown) through a suitable gear reduction means (not shown). As these chain drive means are completely conventional and have been widely used in well known commercial structures by applicant's assignee, no further illustration is believed necessary. Mounted on each of the cross-flights 56 are a plurality of cutter bits 64 suitably disposed along the length thereof for a purpose to be hereinafter more fully described.

An elongated cylindrical crusher roller 66, having cutting or crushing bits 68 suitably, circumferentially mounted on the outer surface thereof, is suitably mounted on an elongated, transverse, horizontal shaft 70 mounted for rotation on main frame 28 rearwardly adjacent the end of the active run of conveying means 52. It is to be appreciated that the bits 68 are mounted on the crusher roller in such a pattern so as to cooperate with the cutter bits on the conveying means 52 to crush disintegrated mineral and pass air entrainable particles therethrough no larger than a predetermined size, say 1 inch minus for example. In lieu of the cutter bits on the conveying means, a second crusher roller may be utilized, if desired, within the purview of the principles of this invention.

A deck plate 71 is provided to support the active run of conveying means 52 and extends from idler sprocket 60 to a trailing edge 72 and extending from edge 72 to the drive sprocket 58 is a screened partition 74 provided for the purpose of passing particles of mined mineral of a discrete size, one inch minus by way of example, through the screen directly therebelow while retaining the larger particles so that they may be conveyed toward the crusher roller 66 where such larger particles will be ground and reduced to the desired small size.

Main frame 28 carries an elongated conduit 76 of generally circular cross-section rigidly secured centrally of the main frame having a nozzle portion 78 at its forward end that is flared laterally outwardly and curved downwardly adjacent the ground surface with the mouth 80 of the nozzle disposed beneath crusher roller 66 and the rearward portion of conveying means 52 for receiving the mineral product gravitationally fed thereto.

At the rear end 82 of conduit 76 is fastened the first of a string of elongated, mobile, tubular conveyor pipes or units 84 which form the transportion or conveyor means, generally designated 86, for the mineral product in a vacuum haulage system extending from the mining machine to a remote point where such mineral is collected and disposed of in a manner hereinafter explained. Suction means are provided at the other extremity of the conveyor 86 to create a suction force therein for moving the mineral product to said remote point.

A self-propelled, mobile platform, generally designated 88, is shown diagrammatically in FIG. 1, which has ground engaging means (not shown) to render it movable over a surface, said platform having a control station 90 for providing primary power and remote guidance control to the miner. A ramp 92 is suitably disposed on the platform and is vertically and horizontally adjustable to launch the miner and conveyor into the opening of the bores in the proper horizontal and vertical relationship thereto, and is also utilizable when retrieving the miner and conveyor from such opening. Also carried by mobile platform 88 is a pipe storage rack 94 and a material collection and separation unit, generally designated 96, comprising a conventional cyclone separator 98, a suction fan 100 of the rotary diffuser type, a settling or "bag house" chamber 102, and a material discharging conveyor 104. Since the above individual components, per se, that make up the collection unit are well known in the art, no further illustration or explanation is believed necessary; however, as far as the applicant can ascertain, mounting such components on a mobile platform is not known. Furthermore, the principles of this invention contemplate the use of separate mobile platforms, if desired: one for the collection unit and one for the control station and ramp, respectively.

Figures 4, 5:
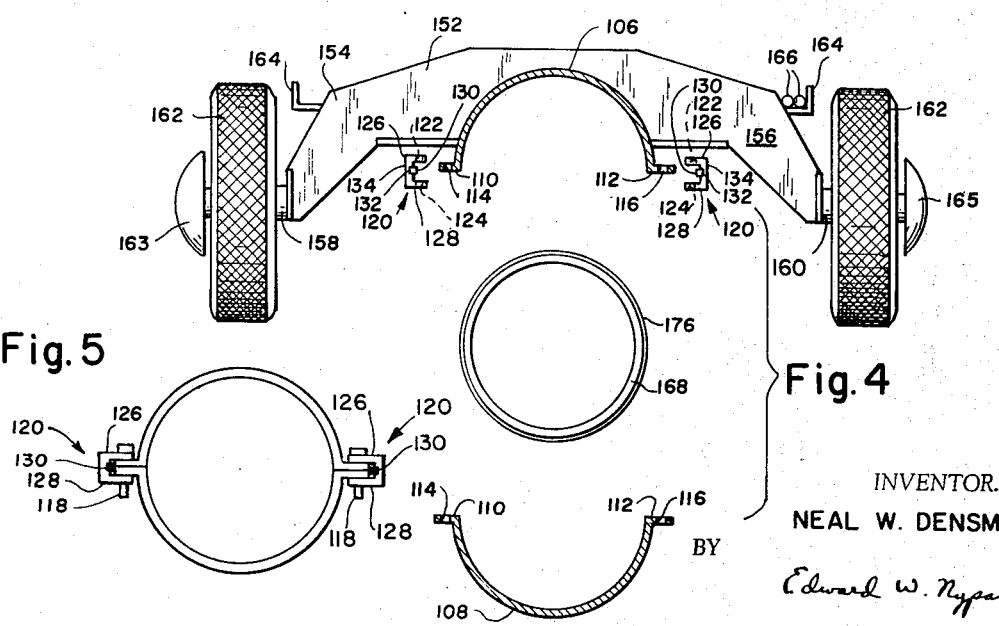
FIG. 4 is an exploded view of a mobile conveyor pipe unit, showing portions of the pipe in section.
FIG. 5 is an end view of the conveyor pipe, shown in a clamped, assembled relationship.

Each of the elongated mobile conveyor pipes or units 84 of the present invention comprises an elongated hollow tubular conduit made up of complementary upper and lower half split members 106 and 108, respectively, of substantially semi-circular trough shape (see FIG. 4) and when in face-to-face abutting relationship as shown in FIG. 5, enclose and form a material carrying bore.

Each of the members 106 and 108 is provided with a pair of integral longitudinal edge flanges 110 and 112 having openings 114, 116 therein, respectively, to slidably receive elongated, circular pins 118 therein for a purpose to be later described.

An elongated clamp generally designated 120 having a U-shaped configuration in cross-section is provided with openings 122, 124 in each of the leg portions 126 and 128, respectively, and is adapted to overlie the flanges of members 106 and 108, respectively, with the openings 122, 124 in alignment with openings 114 and with openings 116 to slidably receive pins 118 for the purpose of fastening such members together. Of course, bolt and nut combinations may be employed in lieu of pins and the clamp may be fastened at a plurality of spaced points along the length of the flanges, if desired, without departing from the scope of the present invention.

In order to prevent pressure leakage between the complementary flanges, a longitudinal seal 130, substantially of square cross-section, is disposed along the parting line of such flanges and is maintained in position by means of a longitudinal slot 132 cut in the bight portion 134 of clamp 120.

Figure 10:
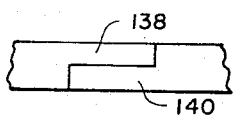
FIG. 10 is an enlarged view, showing the overlapping end portions of a circumferential sealing band.

Since mineral veins do not necessarily extend in a true horizontal direction, connection means are provided for permitting pivotable movement between successive conveyor units to accommodate undulations that occur upwardly and downwardly in the vein while preventing pressure leakage therebetween. With reference to FIG. 7, 8, 9 and 10, such means comprise a suitable, circumferential, sealing band 136 of a substantially rectangular cross-section disposed about the outside surfaces of adjacent end portions 137 and 139 of a pair of adjacent conveyor units 84, and between their respective circumferential end flanges 141 and 143, respectively. Seal 136 may be composed of any suitable pliable material such as rubber, neoprene, plastic, etc., by way of example, and may have overlapping, abutting end portions 138 and 140 as shown in FIG. 10, such end portions being attached together by any suitable, commercial adhesive.

Suitably, rigidly secured, as by means of welding for example, on one end of each upper split member 106 is a lug 142 having an opening 144 therethrough while the adjacent end of each lower split member 108 has a lug 146 rigidly secured thereto as by welding for example, with an opening 148 extending therethrough.

In assembly, openings 144 and 148 are aligned to receive an elongated, circular, releasable pin 150 for attaching the ends of the conveyor units together. It should be noted that a similar fastening means is provided on the opposite side of the conveyor units 84 so that they are pivotable with respect to each other about the diametrically opposed pins 150.

Figure 7:
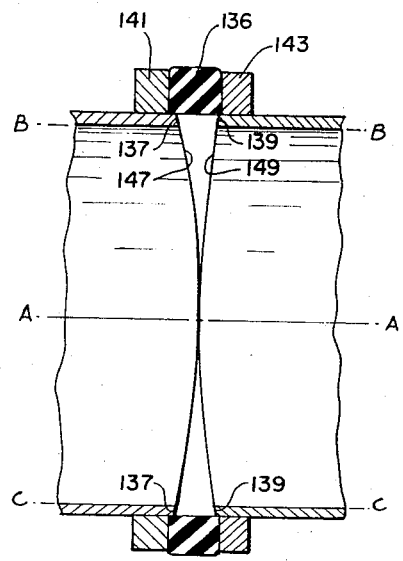
FIG. 7 is an enlarged, fragmentary, vertical section, showing the end portions of two adjacent conveyor units.
Figure 8:
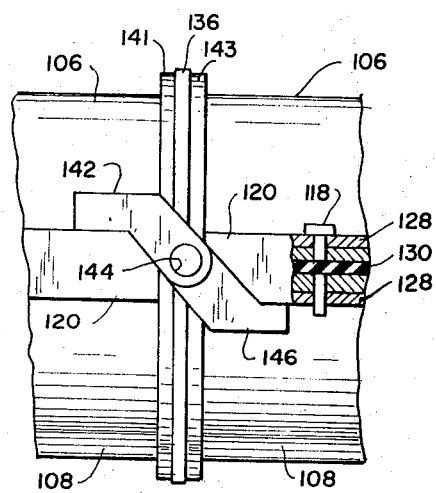
FIG. 8 is a fragmentary, side elevational view, showing the connection means for adjacent conveyor units.
Figure 9:
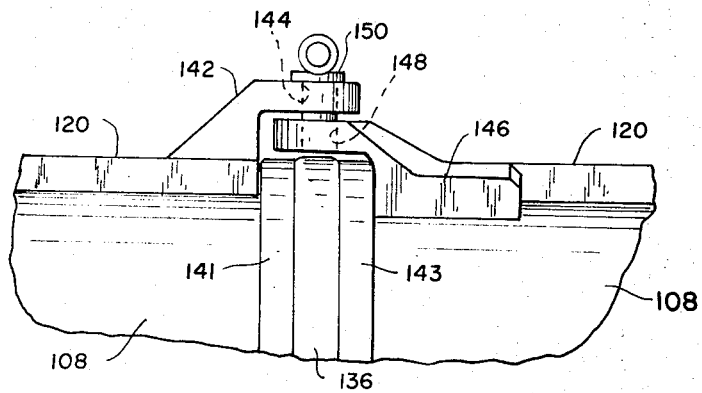
FIG. 9 is a fragmentary, top plan view, illustrating one connection means for adjacent conveyor units.

With reference to FIG. 7, it will be seen that the end portions 147 and 149 of each conveyor unit 84 are arcuately curved from a central horizontal plane A—A cut through the longitudinal axis of said unit to horizontal planes B—B and C—C cut through the highest and lowest vertical points thereon so that the mating end portions 147 and 149 of two adjacent units abut each other at said central horizontal plane and progressively recede from each other upwardly and downwardly until they reach their maximum spacing at said highest and lowest vertical points. Thus, each conveyor unit may pivot relative to an adjacent unit about a horizontal axis disposed normal to the longitudinal axis of said units in order to accommodate undulations commonly found in a mineral vein. In a similar construction and manner as described above, the first unit of the conveyor train is pivotably mounted on the rear end 82 of conduit 76 of the mining machine.

Rigidly secured to the outer surface of upper split member 106 and extending normal to the longitudinal axis thereof is a mobile support cross member 152 (see FIG. 4) having downwardly inclined end portions 154 and 156 for supporting axles 158 and 160, respectively, about which ground engaging means 162 are rotatably mounted, these being hard rubber tire wheels in the present instance. Hub bumpers 163 and 165 extend laterally outwardly from axles 158 and 160, respectively, for absorbing shock and preventing damage to the conveyor unit due to a collision or impact with the side walls or rib of the mined passageway. Adjacent each end of the cross member 152, a guide element 164 is rigidly secured thereto to suitably receive and support multiconductor cables 166 communicating between the miner and an external source of electrical power (not shown) and also communicating between the miner and the remotely located control station 90.

In order to have a true continuous mining operation, the conveyor means must be extensible to follow the miner and transport the mineral product of the action of such miner without any interruption in the mining operation, and, because the instant conveying system is pneumatic, without any significant loss of pressure due to leakage. This result is accomplished on the ramp 92 by means of an elongated, hollow tubular member 168, hereinafter called a "quill."

Figure 12:
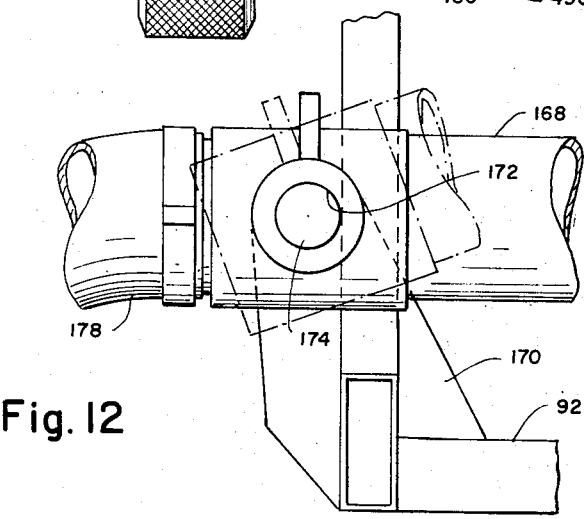
FIG. 12 is a fragmentary side elevation, illustrating the pivoting motion of the "quill" of FIG. 11.

With reference to FIGS. 11 and 12, it will be seen that elongated vertically extending support brackets 170 are suitably rigidly secured to the bottom of ramp 92 and such brackets are provided at their upper portions with laterally extending axially aligned bores 172 therein for receiving trunnions 174 which are suitably secured to the quill housing. Thus, quill 168 may be lowered or raised about a horizontal axis for allowing the miner to be backed onto and carried by the ramp. It should be noted that quill 168 has an outside diameter slightly smaller than the inside diameter of the conveyor units 84 for accommodating the same during assembly.

Adjacent the forward end of quill 168, a pair of conventional, circumferential seals 176 of substantially square cross-section are suitable secured about the periphery thereof to preclude pressure leakage in the conveyor system as the conveyor units are slid thereover. As the mining machine slowly advances pulling the conveyor units 84 off the quill to approximately the position shown in FIG. 11, another unit is assembled about the quill and attached to the conveyor unit ahead while mineral laden air is continuously passing therethrough to the remote collection unit 96.

Any suitable means may be employed for handling the pipe or conveyor units, such as an overhead crane for the upper split members and a floor chain conveyor for the lower split members by way of example, and since such handling means are completely conventional, no further illustration or amplification is believed necessary.

Suitably, releasably secured to the rear end of quill 168 is a flexible conduit 178 leading to the cyclone separator 98 (see FIG. 1) where the heavier, larger particles of the mineral product are retrieved from the air-mineral mixture. The remainder of the dust laden air then passes by way of conduit 180 to the suction fan 100, then to the settling the bag house chamber 102 for further cleaning. The mineral product is discharged from the collection unit by means of a conventional flight conveyor 104 and delivered to a storage or haulage system of the area being mined while clean air is dissipated into the atmosphere.

In operation, platform 88 is moved into a mining location adjacent the highwall. Ramp 92 is positioned at the proper elevation and alignment for the mining machine to properly enter the desired strata to be mined. The mining machine is then advanced toward and into such strata with its forward end engaging the mineral vein and its rearward end suitably connected to the foremost of the conveyor units 84.

The boring heads of the mining machine are positively driven by motors 36 through suitable, conventional gear reduction means (not shown) to detach mineral from the face of bore 24, such mineral being progressively fed rearwardly by flight conveying means 52. As the disintegrated mineral passses over screen 74, discrete particles, say 1 inch minus by way of example, drop through directly to the suction nozzle 78 while the larger particles are retained and directed to the crusher roller 66, which, coacting with the overlapping cutter bits 64, crushes such particles and passes nothing larger than the desired size of mineral product toward the suction nozzle.

A high velocity suction force generated by fan 100 draws the mineral particles in suspension in the air current through the conveyor means 86 to the collection and separation unit 96, where the mineral is separated from the air.

As the mining machine advances, conveyor units are simultaneously assembled around the quill and attached to the unit ahead thereby increasing the length of the tubular conveying means as air entrainable particles are being simultaneously conveyed therethrough and without interfering with the continuous mining operation desirably taking place.

At the end of the operation, the conveyor train is backed onto the ramp 92 by the mining machine and each conveyor unit is detached from the conveyor train, disassembled, and stacked on the platform. It should be appreciated that the quill, having seals disposed circumferentially thereabout, becomes an excellent "pipe cleaner" as the conveyor units are backed out of the bore hole and impaled thereon. When the foremost conveyor unit is disassembled the quill is raised and the mining machine is backed onto the ramp. The entire assembly, including the mining machine and conveyor sections, is then moved by the platform to a new mining site parallel to the completed bore hole and the operation is repeated.

As a result of this invention, there is provided an improved system of mining comprising a remotely controlled, self-propelled, continuous mining machine together with means for continuously transporting or conveying the mineral product mined by the machine to a remote location. By the provision of pneumatic suction means the mineral product is withdrawn from the mining face in suspension through a series of tubular conveyor units to a collection unit, where such mineral product is collected and separated from the air current. By the provision of a "quill," conveyor units are assembled and attached to the conveyor train as the miner advances while precluding pressure leakage therein, thereby permitting extension of the conveyor train without interfering with the continuous mining operation. Furthermore, the clamping members for the conveyor units are constructed and arranged for easy locking and unlocking so that the conveyor units may be conveniently and rapidly assembled, disassembled, connected to and removed from the conveyor train assembly.

FIGS. 13–18 illustrate another embodiment of the continuous mining apparatus of this invention comprising a suitable elongated main frame, generally designated 200, having conventional tread frames 202 suitable, rigidly secured to the laterally opposed sides thereof. Endless tread means 204 are trained about the tread frames 202, respectively, and power means (not shown) are provided for circulating the endless tread means about the tread frames in a manner well known in the art to propel the apparatus along the ground surface. Elongated longitudinally extending front frame supports 206 are suitably, rigidly secured to vertical side portions of the tread frames 202, respectively, and such supports 206 have their respective forward portions extending beyond the forward end of the respective tread means 204 and are provided with laterally extending axially aligned bores 208 therein for receiving trunnions 210 of a front frame 212. Journaled at the forward portion of front frame 212 are a plurality of rotary boring heads, generally designated 214, and a pair of generally vertically extending rotatable crushing and trimming means, generally designated 216, are journaled for rotation in front frame 212 and are disposed rearwardly of the boring heads 214.

Means are provided for swinging the front frame 212 about trunnions 210, said means comprising a pair of suitable extensible hydraulic jacks 218 having the head ends thereof suitably, pivotally mounted at 220 on brackets 222 secured to an upper portion of front frame supports 206, respectively, and having the rod ends thereof suitably, pivotally secured at 224 on lugs 226, respectively, which are secured to the front frame 212. Thus, when liquid under pressure is properly supplied to the hydraulic jacks 218, the front frame 212 may be swung either upwardly or downwardly about its pivots to vary the elevation of said front frame and by trapping liquid within the jacks at opposite sides of the pistons therein, the front frame may be locked in adjusted position.

Figure 13:
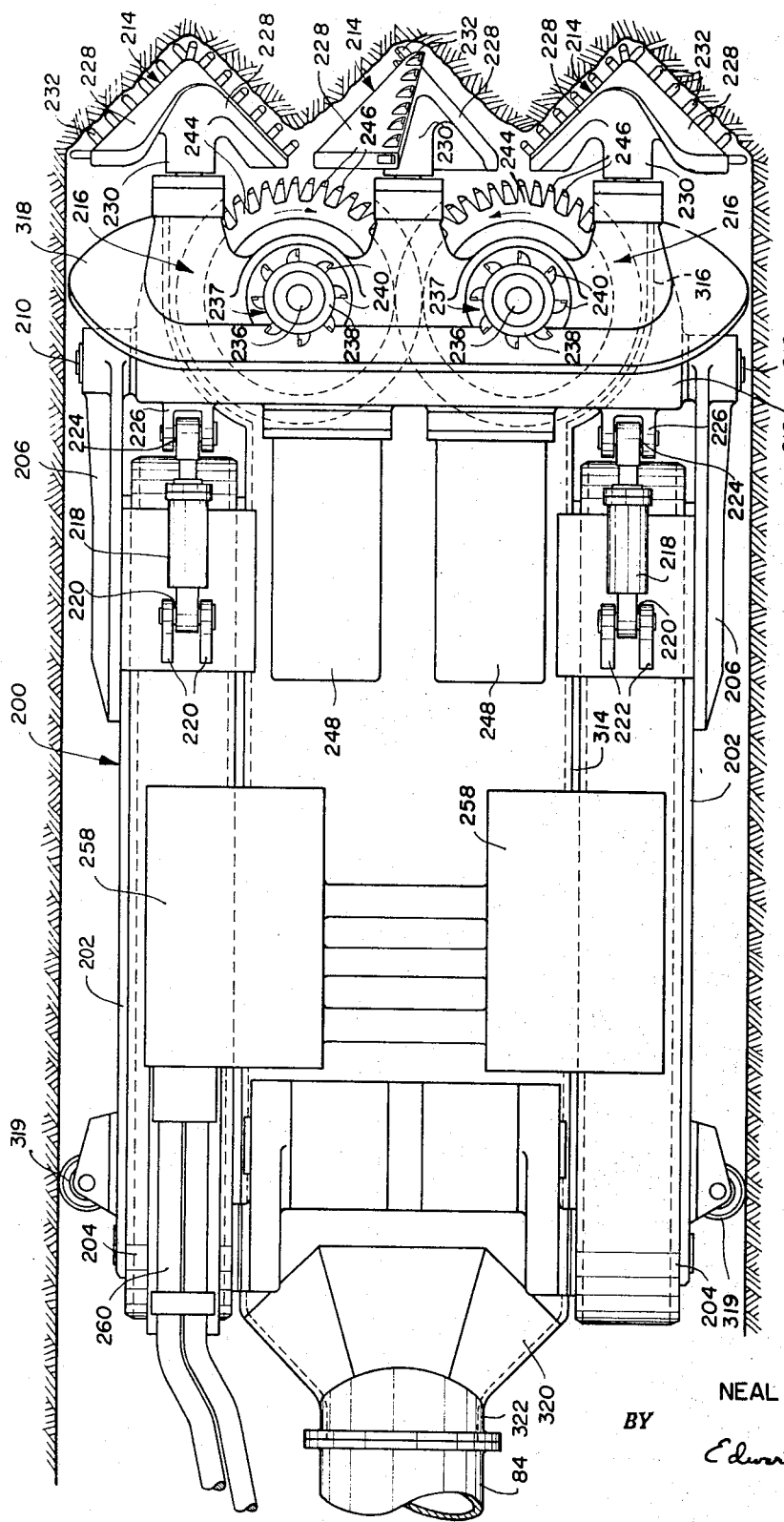
FIG. 13 is a top plan view of a second embodiment of the mining apparatus of the invention.
Figure 30:
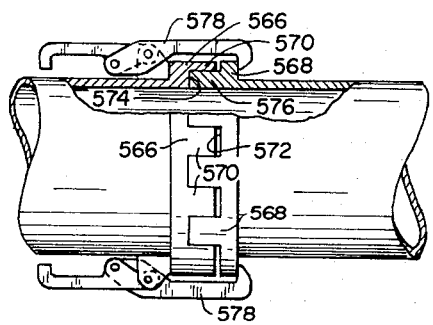
FIG. 30 is a top plan view, partially in section, showing adjacent conveyor pipe units in an assembled relationship.

Boring heads 214 may assume various forms but for illustrative purposes, as herein preferably shown, comprise opposed radial boring arms 228 which extend from a hub portion 230 in an inclined rearwardly direction as shown in FIGS. 13 and 14. Suitably, releasably, mounted longitudinally adjacent the leading edge of boring arms 228 are a plurality of spaced cutter bits 232 for removing mineral from a vein in a manner well known in the mining art. Although preferably three such heads are employed in the instant device, it should be realized that this invention contemplates the use of any suitable number of boring heads, as desired.

Each of the crushing and trimming means 216 comprises a frusto-conical housing 234 rigidly mounted on front frame 212 with the longitudinal axis of said housing disposed in a generally vertical plane. An elongated vertically extending shaft 236 (see (FIG. 17) is rotatably journaled within housing 234 and has a roof trimming means, generally indicated at 237, disposed thereon adjacent its upper end, said roof trimming means comprising a substantially circular cutter support or bit carrier 238 secured to said shaft with spaced cutter bits 240 suitably mounted about the periphery of the carrier 238.

A rotatable cylindrical drum 242 operatively connected to shaft 236 and suitably rotatably journaled within housing 234, has a plurality of vertically spaced circular cutting or crushing discs 244 suitably rigidly mounted thereon with spaced cutting or crushing teeth 246 disposed circumferentially about the periphery of said discs, respectively. It should be noted that each overlying disc 244 of each crushing and trimming means 216 is disposed above an underlying disc in such a manner so that the teeth 246 thereof occupy the spaces between the teeth of the underlying disc when viewed in plan (see FIG. 13) and such crushing teeth are designed and spaced to cooperate with the crushing teeth of the other crushing and trimming means so as not to pass any particles larger than a predetermined size, such as 1 inch minus by way of example.

With the heretofore described boring head structure, it will be realized that three overlapping contiguous cross-sectional bores are formed by three boring heads in the mineral vein. As a result of such overlapping bores, portions of the mineral, commonly called cusps, remain outwardly adjacent the intersection of such bores. Thus, with three boring heads, two upstanding cusps remain which extend upwardly from the surface over which the mining apparatus travels and two cusps remain which depend from the upper surface of the mineral vein (see FIG. 15 wherein is shown one such depending cusp D).

Removal of such cusps is necessary in order to permit advance and retraction of the mining apparatus and to provide a well formed clearance passageway. The upper cusps are removed by the cutter bits 240 on carrier 238 while the lower cusps are removed by the action of the crushing discs 244, thus providing a well formed roof and bottom with a desirable rib-to-roof contour.

With reference to FIGS. 17 and 18, it will be seen that the driving means for the boring heads and crushing means comprises motors 248, desirably electric motors, suitably, rigidly mounted on the rearward portion of front frame 212 and having their power shafts 250 connected through a conventional slip clutch 252, to a drive shaft 254 suitably rotatably journaled in bearings 256. Motors 248 are suitably electrically connected to the controller compartments 258, respectively, which in turn are electrically connected to a suitable remote source of power (not shown) by means of multi-conductor cables 260.

Secured to shaft 254 is a spur gear 262 which meshes with a gear 264 rigidly mounted on a shaft 266 suitably rotatably journaled in bearings 268 and 270. Attached to shaft 266 is a spur gear 271 which meshes with gear 272, in turn meshing with gear 274 mounted on a shaft 276, suitably, rotatably journaled in bearings 278. Mounted on shaft 276 is a sun gear 280 which meshes with a plurality of planet gears 282 mounted on a rotatable support or carrier 284, and these planet gears mesh with an internal ring gear 286 rigidly secured to the gear housing. Extending axially outwardly from carrier 284 is a shaft 288 suitably rotatably journaled in bearings 290 and 292, said shaft 288 being splined as at 294 to receive hub portion 230.

Also enmeshed with gear 271 is a reach gear 296, in turn enmeshed with gear 298 rigidly mounted on shaft 300 suitably, rotatably journaled in bearing 302. Operatively connected to shaft 300 is a planetary gearing system, generally designated 304, for rotating the central boring head in a manner similar to that described in connection with the bottom boring head as shown in FIG. 17.

Extending axially from drive shaft 254 is a reduced shaft portion 306 suitably, rotatably journaled in bearings 308 having a worm 310 mounted thereon which meshes with worm wheel 312 suitably, rigidly secured to shaft 236. It will thus be seen that motor 248 rotatably drives the crushing and trimming means 216 and boring heads 214 through the medium of a reduction gearing system at an angular speed substantially slower than the angular speed of rotation of said motors.

The upper boring head and crushing means, as viewed in FIG. 17, are similar in construction and operation as hereinbefore described in connection with the bottom boring head and crushing means with the exception that a second reach gear similar to 296 is not necessary.

Main frame 200 carries an elongated conduit 314 of generally rectangular cross-section (see FIG. 16) rigidly secured centrally thereof having a nozzle 316 at its forward end that is flared laterally outwardly and curved downwardly adjacent the ground surface so as to encompass or shroud the major portion of the cutting discs 244. A shield 318 is rigidly secured onto front frame 212 and is inclined upwardly rearwardly from the periphery of the mouth of nozzle 316 to adjacent the roof surface of the passageway or bore being formed.

As shown in FIG. 15, shield 318 is designed to lie closely adjacent to but within the periphery or shadow S of the formed bore hole, thus precluding the flow of mineral rearwardly thereof while insuring that the disintegrated mineral will be fed gravitationally downwardly towards the crushing means and the mouth of nozzle 316.

Rib guide rollers 319 are provided on the laterally opposed sides of main frame 200 for facilitating the guidance of the mining machine and for preventing damage thereto as a result of colliding into the ribs of the mined passageway.

Adjacent the rear end of frame 200, the cross-section of conduit 314 is transformed from a rectangular shape to a trapezoidal configuration as at 320, then to a circular shape as at 322, whereat is attached the first of a string of elongated mobile pipes or conveyor units, such as 84, previously described, which form an extensible conveyor system for transporting the mineral product by means of a suction force in a manner similar to that of the embodiment first described.

The mode of operation of this embodiment of the invention (FIGS. 13–18) is as follows: mineral is continuously detached from the seam by the rotary boring heads which form a pattern of overlapping contiguous bores in the seam. The roof trimming means 237 and crushing discs 244 remove the depending and upstanding cusps, respectively, left between the contiguous bores. The cuttings fall toward the crushing discs 244 which crush the larger particles of mineral into air entrainable particles of a predetermined size and pass such mineral product into the nozzle 316 of the conduit 314 from where it is transported or conveyed by an air current moving through said conduit and through an extensible conveyor means to a remote point. Air is drawn from the outside in the direction of arrow (FIG. 14) to the working place and delivered from the working place along with the mineral product through the confined conveyor means by a suction force.

It should be appreciated that the pneumatic system of the present invention forms a mine ventilation system in which fresh air is drawn from the outside to the working area and delivered therefrom in a confined tubular means along with the mineral product, thus reducing the dust nuisance and the explosive dangers of dust and combustible gases in the working area.

The advantages of this embodiment over that of the embodiment first described reside in a crushing and trimming means which functions as a crusher, an upper trim cutter, a bottom trim cutter, and a screen by passing mineral therethrough no larger than a given size. By the provision of a shield, the cuttings are gravitationally directed to the crushing means and nozzle where a negative or suction force sweeps the mineral laden air into a conduit carrying it to the rear of the machine and therebeyond.

Figure 19:
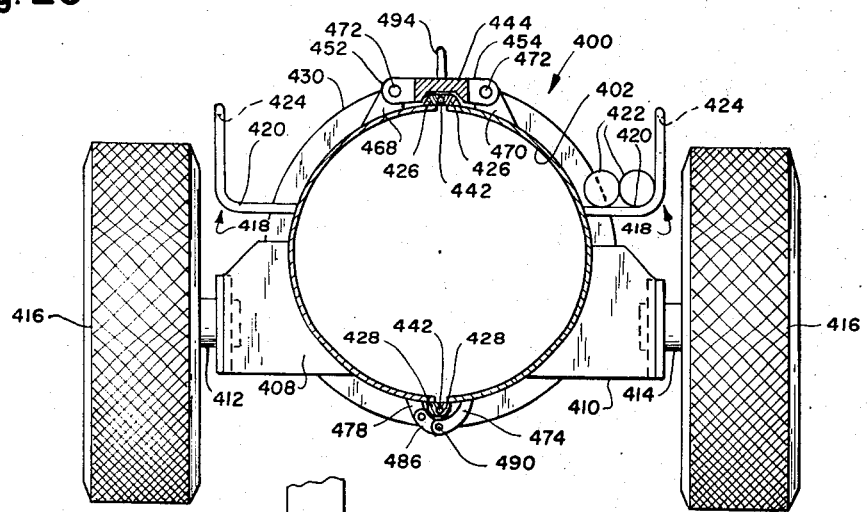
FIG. 19 is a cross-section of a second embodiment of the mobile conveyor pipe unit of this invention.

FIGS. 19–23 illustrate a second embodiment of the conveyor units of the present invention comprising a conveyor unit, generally designated 400, having an elongated hollow cylindrical conduit generally designated 402 which is made up of complementary half or split members 404 and 406, respectively, of semicircular trough shape (see FIG. 20) and when in face-to-face abutting relationship, substantially enclose and form a material carrying bore (see FIG. 19).

Rigidly secured to the outer surfaces of members 404 and 406 substantially midway of the length of said members are a pair of axle support members 408 and 410, respectively, having axles 412 and 414 rigidly secured thereto and extending laterally outwardly therefrom. Hard rubber tire wheels 416 are rotatably mounted on axles 412 and 414, respectively, to render the conveyor unit movable over the ground surface.

A pair of U-shaped hooks, generally indicated at 418, having their leg portions 420, respectively, bent in a reversed L-shape configuration, are suitably, rigidly secured to members 404 and 406 substantially midway along the length thereof for the purpose of supporting multiconductor cables 422 which communicate between the miner and an external source of electrical power. Bight portions 424 of hooks 418 are employed as lifting eyes to receive cable hooks of a handling mechanism (see FIG. 20) during the assembly and disassembly thereof.

Each of the members 404 and 406 is provided with a pair of longitudinal ribs or flanges 426 and 428 disposed at the upper and lower edge portions, respectively, that extend between circumferential end flanges 430 and 432, such flanges 426 and 428 having longitudinal semi-circular grooves 434 and 436 formed in their contacting faces 438 and 440, respectively. Suitable longitudinal seals 442 of any suitable pliable material, such as neoprene, natural rubber, plastic, etc., having substantially circular cross-sections are disposed in the grooves to prevent pressure leakage between the mating flanges. As shown in FIG. 19, the seals may be attached in grooves 434 and 436 of either split member by means of any suitable commercial adhesive or, alternatively, the seals may be releasably disposed in such grooves prior to each assembly operation.

Means are provided for releasably clamping the split members together at their diametrically upper and lower opposed parting lines. For the upper portions, a longitudinal channel member 44 of an inverted U-shape configuration in cross-section is coextensive with longitudinal flanges 426 and has opposed downwardly tapered surfaces 446 and 448 for slidingly engaging the outer upwardly tapered surfaces 450 of flanges 426, respectively.

Adjacent each end of channel member 444, a pair of lugs 452 and 454 integral with such channel member (see FIGS. 21 and 22) extend laterally outwardly from the sides thereof and have openings 456 and 458 therethrough which are aligned with openings 460 and 462 of hinge brackets 468 and 470, respectively, which are rigidly secured to split members 404 and 406, respectively, for receiving elongated cylindrical pins 472, thereby permitting pivotal movement between such split members so that the conveyor units 400 may be disassembled and removed from about quill 168 by swinging the split members away from each other.

Suitably, rigidly, secured adjacent the bottom of split member 406 are a plurality of longitudinally spaced receiving lugs 474 (see FIG. 23) having circular openings 476 therethrough. A plurality of tubular, cylindrical members 478 having bores 480 therethrough are rigidly secured adjacent the bottom of split member 404 for slidably receiving an elongated cylindrical shaft 482, having a grip handle 484 adjacent one end thereof. A plurality of elongated plate members 486, corresponding in number to lugs 474, are suitably, removably secured at one end to shaft 482 by means of set screws 488. Each plate member 486 is formed with a cylindrical pin 490 adjacent the other end thereof, said pin projecting from said plate member and being disposed parallel to the parting line of the split members 404 and 406. It will be readily apparent that when the bottom portions of the split members are brought together for assembly, pins 490 will be in alignment with openings 476 and will be inserted therethrough to provide the proper clamping and locking action. A key and slot arrangement, as shown at 492, may be provided between the shaft 482 and at least one of the cylindrical members 478 to prevent said shaft from rotating, if desired. Although three such clamping devices are preferably shown in FIG. 23, it will be obvious that more or less than three clamping devices may be utilized.

Figure 20:
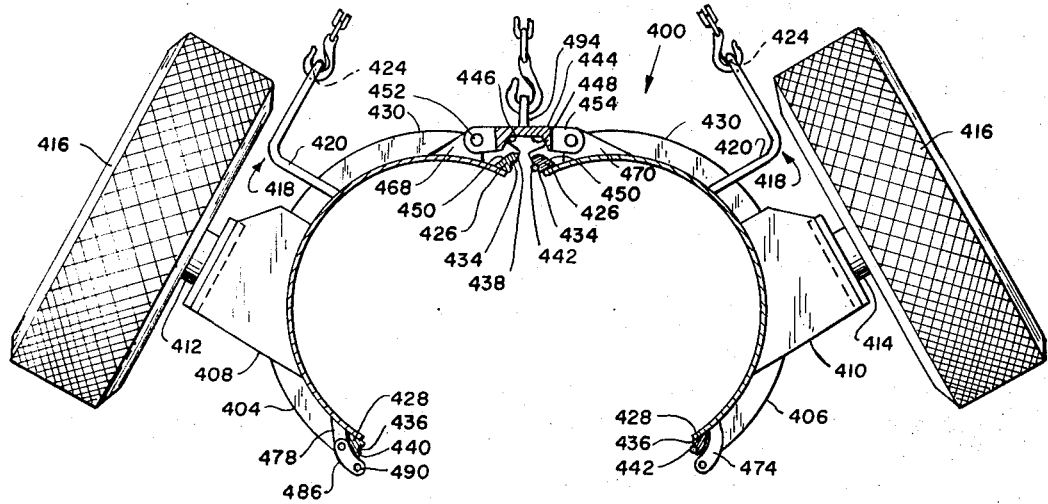
FIG. 20 is a cross-section of the mobile conveyor pipe unit of FIG. 19, illustrating the unit in a disassembled relationship.

A lifting eye 494 is rigidly secured to channel member 444 substantially midway along the length thereof for receiving a cable hook of the conveyor handling means as shown in FIG. 20 of the drawings.

Means similar to that described in connection with the first embodiment (see FIGS. 7, 8, 9 and 10) are provided for attaching the conveyor units together to permit vertical pivoting movement therebetween while precluding pressure leakage.

The embodiment of FIGS. 19–23 has an advantage over the embodiment first described in that both split members are hingedly secured to a common channel member as a unitary structure and all of the sealing and clamping elements therefore are attached to said members to facilitate rapid assembly and disassembly thereof.

FIGS. 24–33 illustrate another embodiment of a mining apparatus and method of this invention employed in a typical hill-top mining plan. Very often in hill-top mining plans, the most advantageous method of removing material therefrom is by a method known as punch mining whereby a mining head and elongated spiral or helical conveyor, commonly called an auger, are longitudinally advanced into the vein at horizontally spaced locations. This helical conveyor comprises a plurality of detachable sections, each of a given length, whereby the vein may be penetrated and mineral recovered therefrom up to a distance of 200 feet for example.

Although such machines have served the purpose for which they were designed, they have not been entirely satisfactory because the friction generated by the mining head with the strata caused the machine to cut downwardly into undesirable strata such as rock by way of example. Moreover, the churning action effected by the spiral conveyor in transporting the mineral and because of the friction generated by said spiral conveyor in the walls of the bore hole, the power requirements are enormous. Accordingly, the depth of penetration is seriously comprised resulting in a low percentage of mineral yield.

This embodiment of the present invention provides a solution to the above problems by providing a novel boring machine for dislodging and distintegrating mineral from a solid mine vein and by providing a novel extensible pneumatic conveying means of substantial length for transporting or conveying the mineral product therethrough to a remote location.

Figure 24:
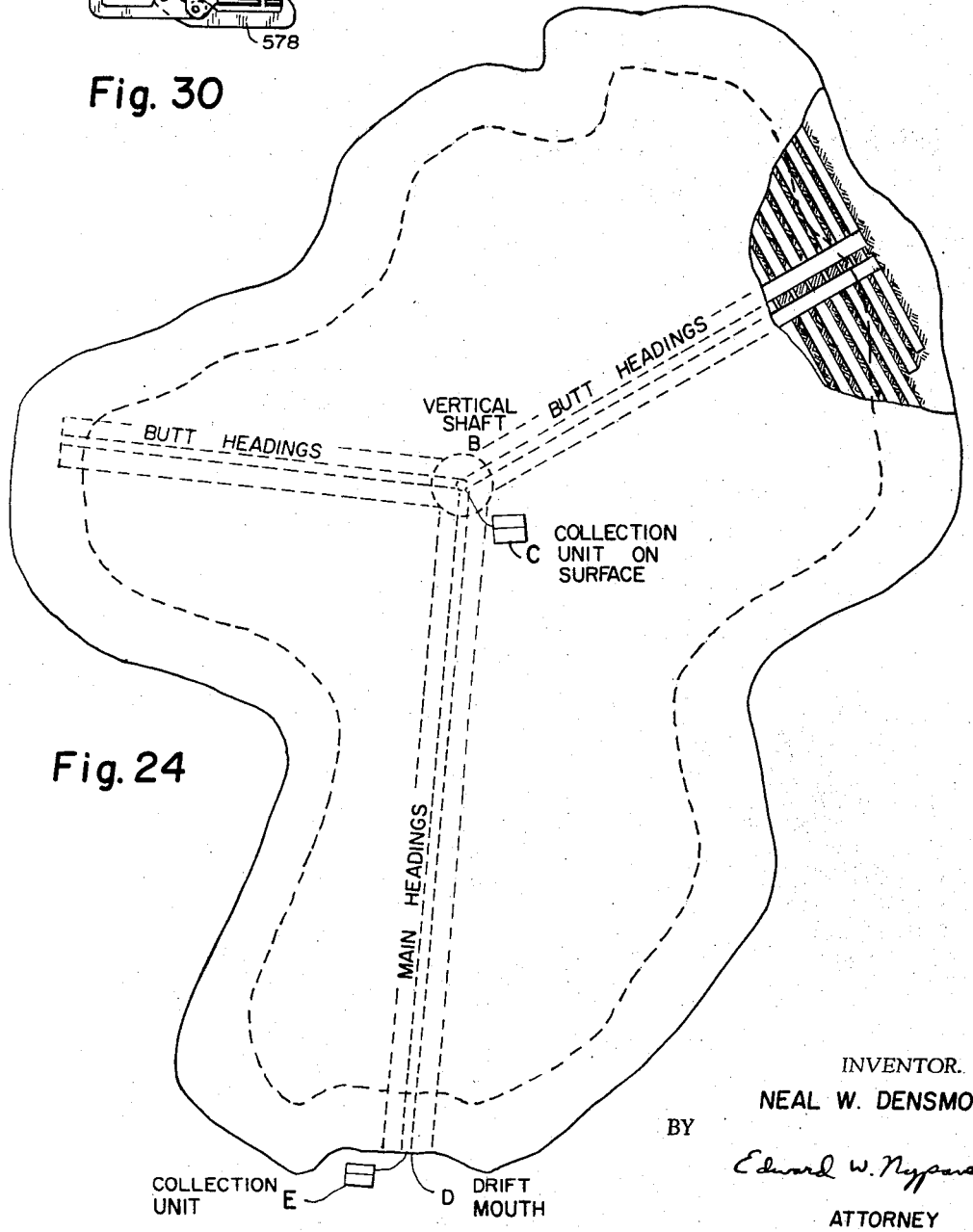
FIG. 24 is a diagrammatic top plan view of a typical hill-top mining plan in which another embodiment of a mining apparatus and method of the present invention is employed.

In FIG. 24 there is shown a top diagrammatic view of a hill-top mining plan having a portion broken away thereof which illustrates one application for the hereinafter described apparatus and method. The mineral from the butt headings may be withdrawn through a vertical shaft B whereat in close proximity to the entrance thereof is located a conventional material collection and separation unit C, and the mineral from the main headings i.e. entries 500 and 502 (see FIGS. 25 and 26) may be withdrawn on retreat through the drift mouth D. A second conventional collection and separation unit E is disposed near the drift mouth D.

The dotted outline of FIG. 24 indicates the extent of penetration reached by a typical auger mining system as opposed to the improved system of this invention whereby substantially all of the mineral is extracted. It should be realized, however, that the apparatus and method of this invention is not restricted to hill-top mining, but also has utility in highwall and deep underground mining systems.

FIGS. 25 and 26 show a diagrammatic view of the instant hill-top scheme illustrating a portion of the mineral vein in horizontal section which comprises main entries 500 and 502 separated by a pillar 504 of unmined mineral, a large unmined portion 506, a plurality of elongated, parallel, completed bore holes 508 (shown extending to the right as viewed in FIG. 25) and one partially completed bore hole 510 separated by elongated, narrow, unmined rib portions 512.

Referring to FIGS. 27 and 28 of the drawings, it will be noted that a boring apparatus constructed in accordance with the principles of this invention comprises an elongated main frame, generally designated 514, supported by a pair of laterally spaced, relatively large steel wheels 516 and 518 rotatably mounted on suitable axles 520 and 522, respectively, and a pair of laterally spaced, relatively smaller steel wheels 524 (only one of which is shown) rotatably mounted on a pair of axles 526 respectively.

Journaled at the forward end of main frame 514 are a pair of rotary boring heads, generally designated 528, each of said heads comprising a pair of opposed radial boring arms 530 and 532 which extend from the forward portion of a hub member 534 in an inclined rearwardly direction as shown in FIGS. 27 and 28. Suitably, releasably mounted longitudinally on each boring arm are a plurality of spaced cutter bits 536 for removing mineral from the vein in a manner well known in the mining art. Although preferably two such heads are employed in the instant apparatus, it should be realized that this invention contemplates the use of any suitable number of boring heads, each having a suitable number of boring arms, as desired.

Boring head rotation and thrust are transmitted by the conveyor means from a carriage as will hereinafter be more fully explained.

A hollow tubular conduit 538 forming a circular material carrying bore is rotatably journaled in suitable bearings 540 and 542 in main frame 514 for rotation relative thereto and has an external gear 544 suitably, rigidly secured thereto which meshes with a gear 546 suitably, rigidly secured onto an elongated shaft 548 rotatably mounted in suitable bearing 550 and 552 of main frame 514. Shaft 548 is suitably connected to hub portion 534 to rotate the same and effect rotation of boring head 528 and in a like construction and manner, except for a reversing idler gear (not shown) disposed between gear 544 and a gear similar to gear 546, the other boring head is caused to rotate in a direction opposite to the first mentioned boring head.

With the heretofore described boring head structure, it will be realized that two overlapping contiguous cross-sectional bores are formed by the two boring heads with an upstanding cusp 547 and a depending cusp 549 remaining adjacent the intersection of such bores (see FIG. 29). The upstanding cusp is removed by a shear blade 551 mounted on nozzle 558 and the depending cusp is removed by shear blade 553 suitably rigidly secured to main frame 514 in order to provide a well formed clearance passageway.

Disposed immediately behind the boring heads is a vertical shield 554 having a rectangular opening 556 at the bottom thereof which forms the mouth of nozzle 558. A plurality of brackets 560 attached to main frame 514 are connected to shield 554 for supporting the same. Shield 554 is designed to substantially cover the periphery of the formed bore hole as shown in FIG. 29 in order to preclude the flow of disintegrated mineral rearwardly thereof and to force the incoming air against the periphery of the bore hole, thus insuring a clean, dust-free bottom.

Nozzle 558 extends from the bottom of shield 554 upwardly and rearwardly to the forward end of conduit 538 and is rigidly secured, as by means of welding, for example, to main frame 514. The rear end of conduit 538 is pivotally attached to the first of a string of elongated tubular conveyor pipe units 562 for limited movement relative thereto about a horizontal axis, such conveyor pipe units being substantially circular in cross-section to form the transportation or conveyor means, generally designated 564, for the mineral product in a negative pneumatic system extending from the nozzle 558 of the mining machine to a remote location where such mineral product is collected and disposed of. Suction means are provided at the other extremity of conveyor means 564 to create a suction force therein for moving the mineral product to said remote location.

Each of the tubular conveyor pipe units 562 has a pair of spaced end flanges 566 and 568 with flange 566 having a plurality of projection 570 extending in a longitudinal direction and flange 568 having a plurality of recesses 572 for accommodating the projections of the adjacent conveyor pipe unit (see FIG. 30) so that the complementary flanges may be sufficiently keyed together in order to transmit the torsional force required for the boring heads.

Flange 566 is provided with an internal annular abutment shoulder 574 and flange 568 is provided with a longitudinally extending end portion 576. A conventional over-center latch 578 is employed on diametrically opposite sides of adjacent conveyor pipe units in order to maintain shoulder 574 and end portion 576 in an abutting relationship when attaching the conveyor pipe units 562 end-to-end.

Each of the conveyor units 562 is supported by a mobile saddle, generally indicated at 580, made up of complementary upper and lower half split members 582 and 584, respectively, of substantially semi-circular trough shape (see FIG. 31) and when in face-to-face abutting relationship, form a circular bore. Members 582 and 584 may be secured together by any suitable means, such as bolts 586 or the like. Enclosed within saddle 580 is a bushing 588 having an inside diameter just slightly larger than the outside diameter of the conveyor pipe units 562 to permit conveyor pipe rotation.

Split member 584 is provided with a bracket 590 having downwardly inclined end portions 592 and 594 for supporting axles 596 and 598, respectively, about which wheels 600 are rotatably mounted.

Figure 32:
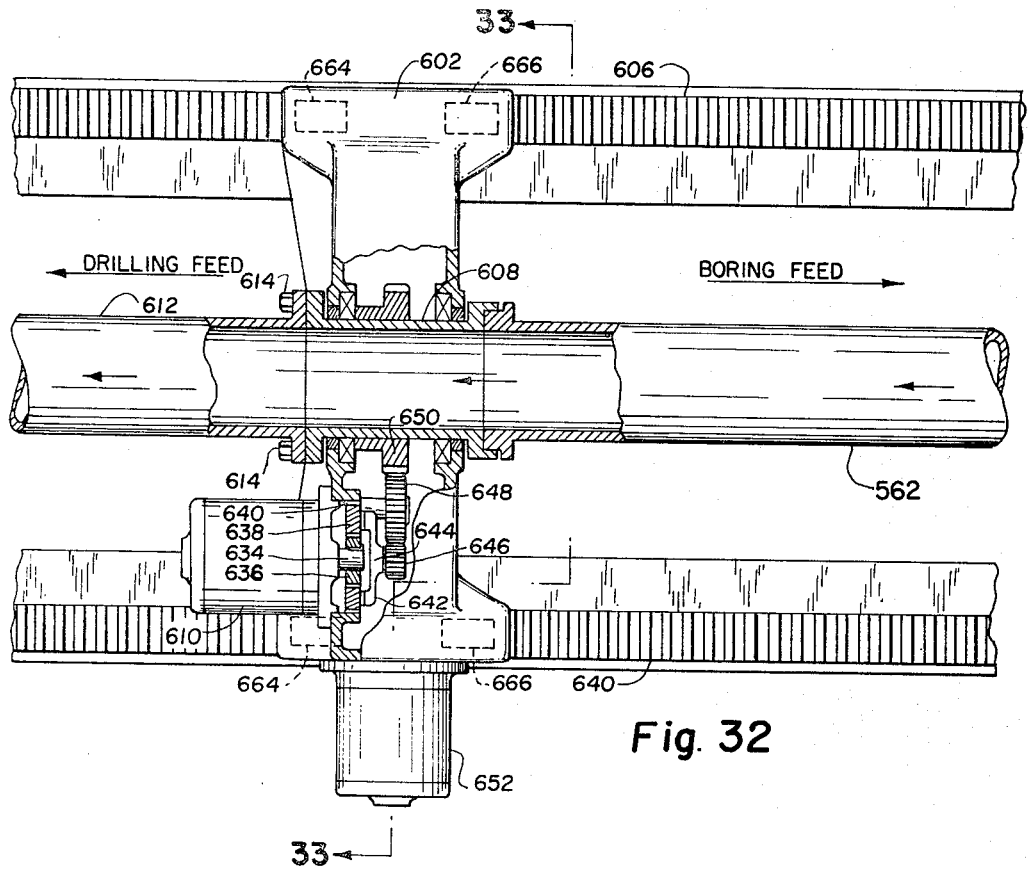
FIG. 32 is an enlarged, fragmentary, top plan view of the carriage of FIG. 25; with parts broken away to show the drive means therefor.
Figure 33:
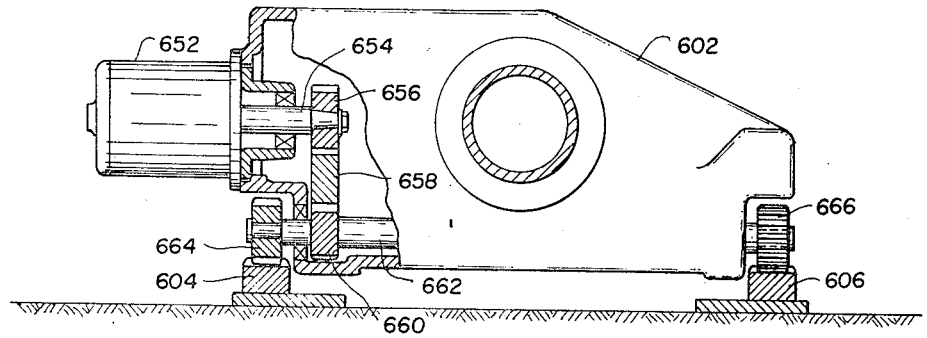
FIG. 33 is a vertical section on line 32—32 of FIG. 32 partially in section.

Means are provided for imparting rotary motion and thrust to the conveyor means 564, such means comprising a carriage 602 supported and guided for reciprocating movement on elongated parallel racks 604 and 606 (see FIGS. 32 and 33).

Rotatably mounted on carriage 602 is a hollow chuck member 608 for imparting rotary movement to the conveyor pipe means, said chuck being driven by motor 610 through a suitable gear reduction means hereinafter more fully described.

An elongated, hollow, tubular member 612, hereinafter called a "quill," is rigidly secured to the rear end of chuck member 608 by any suitable means, such as bolts 614 or the like. A similar keying device as described in connection with the end flanges of the adjacent conveyor units is employed to transmit torsional force from the chuck member 608 to the rearmost conveyor unit 562, and a conventional over-center latch similar to latch 578 is utilized to attach the conveyor unit 562 onto chuck member 608.

As shown in FIG. 25, a bore or quill hole 616 is provided in pillar 504 in order to allow quill 612 to slide therein for providing continuity in the conveying system in the limited space available. An adapter 618 has a shoulder 620 for engaging pillar 504 and a projecting end portion thereof that is fitted into the quill hole 616 with its opposite end suitably connected to a conduit 622 of an elbow configuration. An elongated, hollow, tubular slip member 624 is attached to one end 626 of the main conveying line 628 with the other end slidably received in conduit 622 so that a multiple of quill holes may be bored without unbolting and removing a section of the main line, it being noted that the outside diameter of slip member 624 is slightly smaller than the inside diameter of conduit 622. A pair of conventional, circumferential seals 630 of any suitable composition are disposed about the periphery of slip member 624 to preclude pressure leakage in the conveyor system as conduit 622 is slid thereover. When maximum telescoping is reached, slip member 624 is detached from the main line, a section of the main line is unbolted and rolled out of the way, and the slip member 624 is extended out of conduit 622 and reattached to the main line, thus shortening the run of the main line.

Roof jacks 632 may be utilized to support the adapter and the main line 628 at spaced intervals. Main line 628 is connected at its other extremity to a conventional material collection and separation assembly, not shown but well known in the art, comprising a cyclone separator, a suction fan and a dust collector, where the mineral is separated from the air.

With reference to FIG. 32, it will be seen that the driving means for imparting rotary motion to chuck member 608 comprises an electric motor 610 suitably rigidly mounted on carriage 602 and having a power shaft 634. Secured on shaft 634 is a sun gear 636, which meshes with a plurality of planet gears 638, in turn meshing with an internal ring gear 640, which is rigidly secured to the drive housing. Planet gear 638 are carried by a rotatable support or planet carrier 642, and since ring gear 640 is fixed, the planet carrier 642 will rotate relative thereto. An extension 644 of planet carrier 642 has a spur gear 646 rigidly secured thereon meshing with a gear 648, in turn meshing with a gear 650, which is rigidly secured to check member 608. Thus, it will be seen that motor 610 rotatably drives chuck member 608 through the medium of a reduction gearing system at an angular speed which is substantially slower than the angular speed of rotation of the motor.

With reference to FIG. 33, the driving means for reciprocating carriage 602 comprises an electric motor 652 suitably rigidly secured on carriage 602, having a power shaft 654 and a gear 656 rigidly secured thereto. Gear 656 meshes with gear 658, which in turn meshes with gear 660 suitably rigidly attached to an elongated transversely extending shaft 662, having a drive pinion 664 suitably rigidly secured at each end thereof for engagement with racks 604 and 606, respectively.

A pair of spaced idler pinions 666 (only one of which is shown in FIG. 33) are suitably rotatably secured to carriage 602 for engagement with racks 604 and 606, respectively. Thus, motor 652 effects reciprocation of carriage 602 through the medium of a gear reduction arrangement and a rack and pinion assembly.

The mode of operation is as follows: the mining machine advances into the mineral vein by means of the carriage 602 during the mining operation, and the mineral of the vein is dislodged and disintegrated by the revolving boring heads 528, which form a pattern of overlapping contiguous bores, the upstanding and depending cusps being removed by shear blades 551 and 553, respectively, to form a well-formed roof and bottom with a desirable rib-to-roof contour (see FIG. 31). The disintegrated mineral removed by the boring heads falls toward the opening of nozzle 558 from where it is transported or conveyed in suspension by a negative air current moving through said nozzle, the extensible conveyor means 564, quill 612, quill hole 616, adapter 618, conduit 622, slip member 624 and the main line 628 to the externally located collection and separation unit. Air is drawn from the outside in the direction of arrow A to the working place and delivered from the working place along with the mineral product through the confined conveyor means 564 by a suction force located at the collection unit.

Boring head rotation and thrust are transmitted by the conveyor means 564 from the carriage 602. During movement of the carriage from its retracted position toward the mineral vein to its extended position, the conveyor pipe units 562 are advanced longitudinally into the bore hole while being simultaneously rotated. When the carriage reaches its fully extended position, the operator stops the air flow by "gating" the fan and disconnects the last conveyor pipe unit 562 from chuck member 608. The carriage is retracted and another conveyor pipe unit is attached to the preceding unit and to the chuck member 608, whereupon the cycle is repeated to the full depth of the bore hole being formed.

When a bore hole is completed, the mining machine and string of conveyor pipe units remain in the bore hole while the carriage is moved by means of any suitable means, such as a winch 668 (see FIG. 25) by way of example, such winch being adapted to be rigged to a "dead man" (not shown) disposed in entry 502 to a new mining site parallel to the completed bore hole. After lining up in the new location, a special cutting head 670 (see FIG. 26) is mounted on the quill 612 on the end remote from chuck member 608 for drilling a new quill hole in the pillar, and an elongated, hollow, flexible, jumper pipe 672 is attached to the chuck member at one end with its other end inserted in the previously formed quill hole 616. If a thicker pillar 504 is desired, an extension may be provided on the end of quill 612.

After breakthrough, adapter 618, along with conduit 622, is moved to the recently formed quill hole. Jumper pipe 672 is removed, quill 612 is retracted, cutter head 670 is removed and the apparatus is in position to initiate the forming of another bore hole.

It should be appreciated that as each conveyor pipe unit 562 is required, it is pulled out of storage from the previously formed bore hole by any suitable means, such as winch 188 for example and attached in longitudinal alignment between the preceding conveyor pipe unit and chuck member 608, and advanced into the bore hole. By employing two relatively cheap boring machines as herein disclosed, down time is considerably reduced, and the problem of conveyor pipe storage is obviated.

From the foregoing, it is apparent that as a result of this embodiment of the present invention, there is provided an improved system of mining, comprising a boring machine which is compact and simple in construction, reliable in operation and requires only a minimum number of moving parts, together with an extensible pneumatic conveying means for transporting the mineral product to a collection unit where such mineral product is collected and separated from the air current. The collection unit remains outside of the mine in fresh air, thereby serving to ventilate and to prevent contamination of the air in the mine with dust and gases.

A further advantage residing in the apparatus of this invention is that the conveyor pipe units serve to convey mineral and dust while ventilating the bore hole. As a result, the necessary hole ventilation for methane dilution is provided for, and the "vacuum cleaned" hole eliminates the need for rock dusting. Furthermore, by disposing the intake opening of nozzle 558 in close proximity to the boring arms, the air entrainable particles will be drawn from the face immediately on being loosed, thereby increasing the rate of advance while precluding power losses resulting from churning loose mineral.

Another advantage residing in the apparatus of this invention is that the conveyor pipe units serve to transmit rotary power and thrust to the boring heads, thus eliminating the need for electrical or hydraulic power within the bore hole. Also, no crawler treads or wheels with traction are required.

Another advantage of the apparatus of this invention is that maximum safety is achieved because workmen are not required to enter the bore hole. Moreover, the elimination of roof supports results in an appreciable cost reduction.

FIGS. 34 and 35 illustrate still another embodiment of a mining apparatus and method of this invention employed in a typical highwall plan which is very similar to the embodiment described in connection with FIGS. 24–33 with the exception that a platform is employed to carry the carriage, such platform being provided with overhead conveyor pipe handling equipment. The same boring machine, carriage and tubular conveyor units as described in connection with the embodiment of FIGS. 24–33 are duplicated in the instant embodiment and the same reference characters primed are used to identify elements which are similar to those used in the above referred to embodiment.

A platform, generally designated 680, is supported by four leveling jacks 682 which are suitably connected together by a pair of horizontally spaced, elongated, longitudinally extending I-beams 684 and 686 and a pair of horizontally spaced, elongated, transversely extending I-beams 688 and 690. Suspended from the beams 684 and 686 and suitably rigidly secured thereto are a pair of laterally spaced, elongated, transversely extending rails 692 and 694 fo rcarrying a pair of hoists (not shown) to facilitate handling of the conveyor pipe units during the attachment and removal thereof onto and from the conveyor line. Extending laterally outwardly from platform 680 is a horizontally disposed bracket 696 on which is suitably mounted a winch 668' for a purpose to be hereinafter explained.

In lieu of a quill, a carriage 602' is provided with an elongated, flexible tube or conduit 698 which extends to a mobile collection and separation unit similar to that described in connection with the embodiment of FIG. 1.

It will be readily apparent that as each conveyor pipe 562' unit is required, it is pulled out of storage from the previously formed bore hole by winch 668', disconnected from the stored conveyor line, moved into position by hoists on rails 692 and 694 and attached in longitudinal alignment between chuck member 608' and the preceding conveyor pipe unit 562'. Platform 680 is moved from a completed hole to a new mining site parallel to the completed hole to a new mining site parallel to the completed hole by means of winch 668' adapted to be rigged to a "dead man," not shown but well known in the art, down the highwall.

This embodiment has an advantage over the embodiment of FIGS. 24–33 in that the carriage, winch and conveyor pipe handling means are carried by platform 680 and can be readily move das a unit from one location to another.

Preferred embodiments of this invention having been described and illustrated, it is to be realized that modifications thereof may be made without departing from the broad spirit and scope of this invention as defined in the appended claims.

What is claimed is:

1. The method of mining and conveying mineral comprising: removing mineral from a vein; pneumatically conveying air entrainable particles of such minerals through an elongated tubular means to a remote location; and selectively increasing the length of said tubular means by adding other tubular means to said first mentioned tubular means while said removing and conveying continues.

2. The method of mining and conveying mineral comprising: continuously removing mineral from a vein; crushing such mined mineral into air entrainable particles; continuously pneumatically conveying such particles through an elongated tubular means to a remote location; and selectively increasing the length of said tubular means by adding other tubular means to said first mentioned tubular means while simultaneously removing mineral from said vein and conveying such particles.

3. The method of mining and conveying mineral comprising: continuously removing mineral from a vein for a period of time; crushing such mined mineral into air entrainable particles during such period of time; conveying such particles during such period of time by entraining such particles in an air current flowing through an elongated tubular means; and selectively increasing the length of said tubular means during such period of time by adding other tubular means to said first mentioned tubular means while simultaneously removing mineral from said vein and conveying such particles.

4. A mining and conveying apparatus comprising: a mobile frame; disintegrating means mounted on said frame; first tubular means mounted on said frame for receiving material from said disintegrating means; at least one second tubular means extending from said first tubular means for receiving material from said first tubular means; means for adding other of said second tubular means in sequence to said one second tubular means; and means cooperable with one of said tubular means for generating a flow of air in all of said tubular means.

5. A mining and conveying apparatus comprising: an elongated mobile frame; disintegrating means mounted on one end of said frame for removing mineral from a vein; conduit means mounted on said frame and located to gravitationally receive mineral from said disintegrating means; a train of elongated hollow members extending from said conduit means; means cooperable with said hollow members for generating an air current in said conduit means and said train of hollow members; and means for selectively adding hollow members to said train without interrupting said air current.

6. A mining and conveying apparatus comprising: an elongated mobile frame; disintegrating means mounted on one end of said frame for removing mineral from a vein; means mounted on said frame for crushing such mined mineral; conduit means mounted on said frame and located to gravitationally receive mineral from said crusher means; a train of elongated hollow members extending from said conduit means; means cooperable with said hollow members for generating an air current in said conduit means and said train of hollow members; and means for selectively adding other hollow members to said train while mineral laden air is being conveyed therethrough.

7. A mining apparatus comprising: an elongated mobile frame; disintegrating means mounted on one end of said frame for removing mineral from a vein; at least one elongated crushing means for crushing mined mineral into air entrainable particles; said crushing means being mounted on said frame rearwardly of said one end for rotary movement about a vertical axis; said crushing means having crushing elements at one end thereof; an elongated conduit mounted on said frame; and said conduit having a portion at one end thereof partially enveloping said crushing elements for receiving air entrainable particles therefrom.

8. A mining apparatus comprising: an elongated mobile frame; disintegrating means mounted on one end of said frame for removing mineral from a vein; at least one crushing means for crushing mined mineral into air entrainable particles; said crushing means being mounted on said frame rearwardly of said disintegrating means for rotary movement about a vertical axis; said crushing means having crushing elements mounted on a lower portion thereof; an elongated conduit mounted on said frame; and said conduit having a portion at one end thereof partially enveloping said crushing elements for receiving air entrainable particles therefrom.

9. A mining apparatus comprising: an elongated mobile frame; disintegrating means mounted on one end of said frame for removing mineral from a vein; at least one crushing means for crushing mined mineral into air entrainable particles; said crushing means being mounted on said frame rearwardly of said disintegrating means for rotary movement about a vertical axis; said crushing means having crushing elements mounted on a lower portion thereof and cutting elements spaced upwardly from said crushing elements; an elongated conduit mounted on said frame; said conduit having a portion at one end thereof partially enveloping said first crushing elements for receiving air entrainable particles therefrom; and shield means mounted on said frame for directing mined mineral toward said portion of said conduit.

10. A mining apparatus comprising: an elongated mobile frame; disintegrating means mounted on one end of said frame for removing mineral from a vein; at least one crushing means for crushing mined mineral into air entrainable particles; said crushing means being mounted on said frame rearwardly of said disintegrating means for rotary movement about a vertical axis; said crushing means having a plurality of vertically spaced crushing elements mounted on a lower portion thereof and cutting elements spaced upwardly from said plurality of crushing elements; an elongated conduit mounted on said frame; said conduit having a portion at one end thereof partially enveloping said plurality of crushing elements for receiving air entrainable particles therefrom; and shield means mounted on said frame for directing mined mineral toward said portion of said conduit.

11. A mining apparatus comprising: an elongated mobile frame; disintegrating means mounted on one end of said frame for removing mineral from a vein; a pair of crushing means for cooperably crushing mined mineral into air entrainable particles; said crushing means being mounted on said frame rearwardly of said disintegrating means for rotary movement about substantially vertical axes, respectively; said crushing means having a plurality of vertically spaced crushing elements mounted on lower portions thereof, respectively; an elongated conduit mounted on said frame; said conduit having a portion at one end thereof partially enveloping said plurality of crushing elements of said crushing means, respectively, for receiving air entrainable particles therefrom; and shield means mounted on said frame for directing mined mineral toward said portion of said conduit.

12. A conveying apparatus comprising: means for supporting an elongated conduit; said conduit consisting of a pair of elongated members; each of said members having a pair of longitudinal flanges axially coextensive therewith; means for releasably maintaining said flanges of said members, respectively, in an abutting relationship to form a material carrying bore; said means for supporting said elongated conduit having portions extending laterally outwardly from either side of said conduit; and mobile ground engaging means carried by said portions, respectively.

13. A conveying apparatus comprising: means for supporting an elongated conduit; said conduit consisting of a pair of elongated members; each of said members having a pair of longitudinal flanges axially coextensive therewith; means for releasably maintaining said flanges of said members, respectively, in an abutting relationship to form a material carrying bore; resilient means disposed along the parting lines of adjacent flanges and coextensive therewith to form a fluid tight seal therebetween; said means for supporting said elongated conduit having portions extending laterally outwardly from either side of said conduit; and mobile ground engaging means carried by said portions, respectively.

14. A conveying apparatus comprising: an elongated conduit consisting of a pair of elongated members; each of said members having a pair of longitudinal edge flanges axially coextensive therewith; means engaging said flanges for clamping said members together to form a material carrying bore; resilient means disposed along the parting lines of adjacent flanges and coextensive therewith to form a fluid tight seal therebetween; a support member secured to one of said elongated members and having portions extending laterally outwardly from either side of said one elongated member; and mobile ground engaging means carried by said portions, respectively.

15. A conveying apparatus comprising: an elongated conduit consisting of a pair of elongated members; each of said members having a pair of longitudinal flanges axially coextensive therewith; means for releasably maintaining said flanges of said members, respectively, in an abutting relationship to form a material carrying bore; said elongated members being pivotally mounted adjacent their flanges, respectively, to an elongated member coextensive with said elongated members; resilient means disposed along the parting lines of adjacent flanges and coextensive therewith to form a fluid tight seal therebetween; support members secured to said elongated members, respectively, and extending laterally outwardly therefrom; and mobile ground engaging means carried by said support members, respectively.

16. A conveying apparatus comprising: a train of mobile, elongated hollow members having end portions connected in tandem; connection means for pivotally connecting the end portions of adjacent members, respectively, for relative swinging movement about horizontal axes; resilient means disposed about the peripheries of the end portions of adjacent members, respectively, to form a fluid tight seal; and means for increasing the length of said train while mineral laden air is being conveyed therethrough.

17. A mining and conveying apparatus comprising: a mobile frame; disintegrating means mounted on said frame; means remote from said disintegrating means for simultaneously effecting rotation and thrust of said disintegrating means; first tubular means mounted on said frame for receiving material from said disintegrating means; at least one second tubular means extending from said first tubular means for receiving material from said first tubular means and for transmitting rotation and thust to said disintegrating means; means for adding other of said second tubular means in sequence to said one second tubular means; and means cooperable with one of said tubular means for generating a flow of air in all of said tubular means.

18. A mining and conveying apparatus comprising: a mobile frame; disintegrating means mounted on said frame; carriage means remote from said disintegrating means for simultaneously effecting rotation and thrust; first tubular means mounted on said frame to receive material from said disintegrating means; at least one second elongated tubular means extending from said first tubular means and connected to said carriage means for receiving material from said first tubular means and for transmitting rotation and thrust from said carriage means to said disintegrating means; said carriage means including means for inserting other of said second tubular means in sequence between said carriage means and said one second tubular means; and means cooperable with one of said tubular means for generating a flow of air in all of said tubular means.

References Cited
UNITED STATES PATENTS

| | | | |
|---|---|---|---|
| Re. 24,004 | 5/1955 | Howard | 299—57 |
| 2,528,748 | 11/1950 | Greene | 299—56 |
| 2,744,620 | 5/1956 | Davis et al. | 138—159 X |
| 2,879,787 | 3/1959 | Ingram | 137—344 |
| 3,217,725 | 11/1965 | Varian | 137—580 X |

FOREIGN PATENTS

| | | |
|---|---|---|
| 165,358 | 9/1955 | Australia. |
| 880,876 | 6/1953 | Germany. |

ERNEST R. PURSER, *Primary Examiner.*